United States Patent
Masuike et al.

(10) Patent No.: US 10,962,364 B2
(45) Date of Patent: Mar. 30, 2021

(54) MOBILE ELECTRONIC DEVICE AND ROADSIDE UNIT

(71) Applicant: KYOCERA Corporation, Kyoto (JP)

(72) Inventors: Isao Masuike, Machida (JP); Hideki Morita, Yokohama (JP); Koutaro Yamauchi, Yokohama (JP)

(73) Assignee: KYOCERA Corporation, Kyoto (JP)

(*) Notice: Subject to any disclaimer, the term of this patent is extended or adjusted under 35 U.S.C. 154(b) by 192 days.

(21) Appl. No.: 16/328,557

(22) PCT Filed: Aug. 23, 2017

(86) PCT No.: PCT/JP2017/030091
§ 371 (c)(1),
(2) Date: Feb. 26, 2019

(87) PCT Pub. No.: WO2018/043239
PCT Pub. Date: Mar. 8, 2018

(65) Prior Publication Data
US 2020/0217659 A1    Jul. 9, 2020

(30) Foreign Application Priority Data
Aug. 29, 2016 (JP) .............. JP2016-166832

(51) Int. Cl.
*G01C 5/06* (2006.01)
*G01L 27/00* (2006.01)
*G01C 21/20* (2006.01)

(52) U.S. Cl.
CPC .............. *G01C 5/06* (2013.01); *G01C 21/20* (2013.01); *G01L 27/002* (2013.01)

(58) Field of Classification Search
CPC ..... G01L 27/002; G01L 27/005; G01L 19/04; G01L 19/02; G01C 5/06; G01C 21/20; H04M 1/00
See application file for complete search history.

(56) References Cited

U.S. PATENT DOCUMENTS

| | | | |
|---|---|---|---|
| 6,518,918 B1 | 2/2003 | Vannucci et al. | |
| 2012/0265373 A1* | 10/2012 | Ingvalson | G01C 21/20 701/4 |
| 2012/0316831 A1* | 12/2012 | Klinghult | G01C 5/06 702/166 |
| 2015/0133145 A1* | 5/2015 | Palanki | G01C 25/00 455/456.1 |
| 2016/0091385 A1 | 3/2016 | Heshmati et al. | |
| 2016/0245716 A1 | 8/2016 | Gum et al. | |
| 2016/0320186 A1 | 11/2016 | Tanabe et al. | |

FOREIGN PATENT DOCUMENTS

| | | |
|---|---|---|
| JP | 2002-039751 A | 2/2002 |
| JP | 2011-117818 A | 6/2011 |
| JP | 2015-121481 A | 7/2015 |

* cited by examiner

*Primary Examiner* — Benjamin R Schmitt
(74) *Attorney, Agent, or Firm* — Studebaker & Brackett PC

(57) ABSTRACT

A mobile electronic device comprises a communication unit obtaining a first atmospheric pressure value from a roadside unit associated with a pedestrian bridge, an atmospheric pressure sensor obtaining a second atmospheric pressure value of the mobile electronic device, and a controller. The controller calculates a correction value of the second atmospheric pressure value based on the first atmospheric pressure value.

6 Claims, 13 Drawing Sheets

F I G. 4
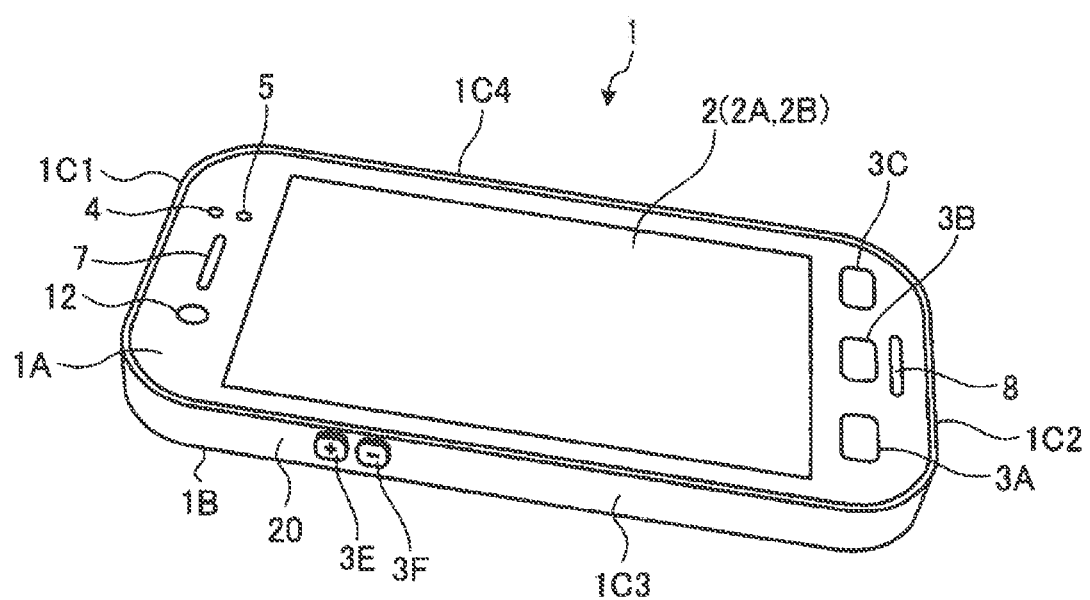

MOBILE ELECTRONIC DEVICE AND ROADSIDE UNIT

CROSS-REFERENCE TO RELATED APPLICATION

The present application is a National Phase entry based on PCT Application No. PCT/JP2017/030091 filed on Aug. 23, 2017, entitled "PORTABLE ELECTRONIC INSTRUMENT, ROADSIDE DEVICE, PORTABLE ELECTRONIC INSTRUMENT CONTROL PROGRAM, AND ROADSIDE DEVICE CONTROL PROGRAM" which claims the benefit of Japanese Patent Application No. 2016-166832 (filed on Aug. 29, 2016) entitled "MOBILE ELECTRONIC DEVICE, ROADSIDE UNIT, MOBILE ELECTRONIC DEVICE CONTROL PROGRAM, AND ROADSIDE UNIT CONTROL PROGRAM". The content of which are incorporated by reference herein in their entirety.

FIELD

The present disclosure relates to mobile electronic devices.

BACKGROUND

Known is a technique of detecting a pressure change with an atmospheric pressure sensor to calculate an altitude change of a subject device.

SUMMARY

A mobile electronic device according one aspect comprises a communicator obtaining a first atmospheric pressure value from a roadside unit associated with a pedestrian bridge, an atmospheric pressure sensor obtaining a second atmospheric pressure value of the mobile electronic device, and at least one processor. The at least one processor is configured to calculate a correction value of the second atmospheric pressure value based on the first atmospheric pressure value.

A roadside unit according to one aspect comprises a first communicator obtaining a first atmospheric pressure value from a mobile electronic device, a second communicator transmitting data to the mobile electronic device, an atmospheric pressure sensor obtaining a second atmospheric pressure value on a pedestrian bridge associated with the roadside unit, and at least one processor. The at least one processor is configured to calculate a correction value of the first atmospheric pressure value based on the second atmospheric pressure value, and control the second communicator so that the second communicator transmits the data including the calculated correction value.

A roadside unit according to one aspect comprises a communicator obtaining a first atmospheric pressure value from a mobile electronic device, an atmospheric pressure sensor obtaining a second atmospheric pressure value on a pedestrian bridge associated with the roadside unit, and at least one processor. The at least one processor is configured to calculate a correction value of the second atmospheric pressure value based on the first atmospheric pressure value.

BRIEF DESCRIPTION OF DRAWINGS

FIG. 4 A perspective view illustrating one example of the smartphone according to the first embodiment.

DETAILED DESCRIPTION

First Embodiment

Figure 1:
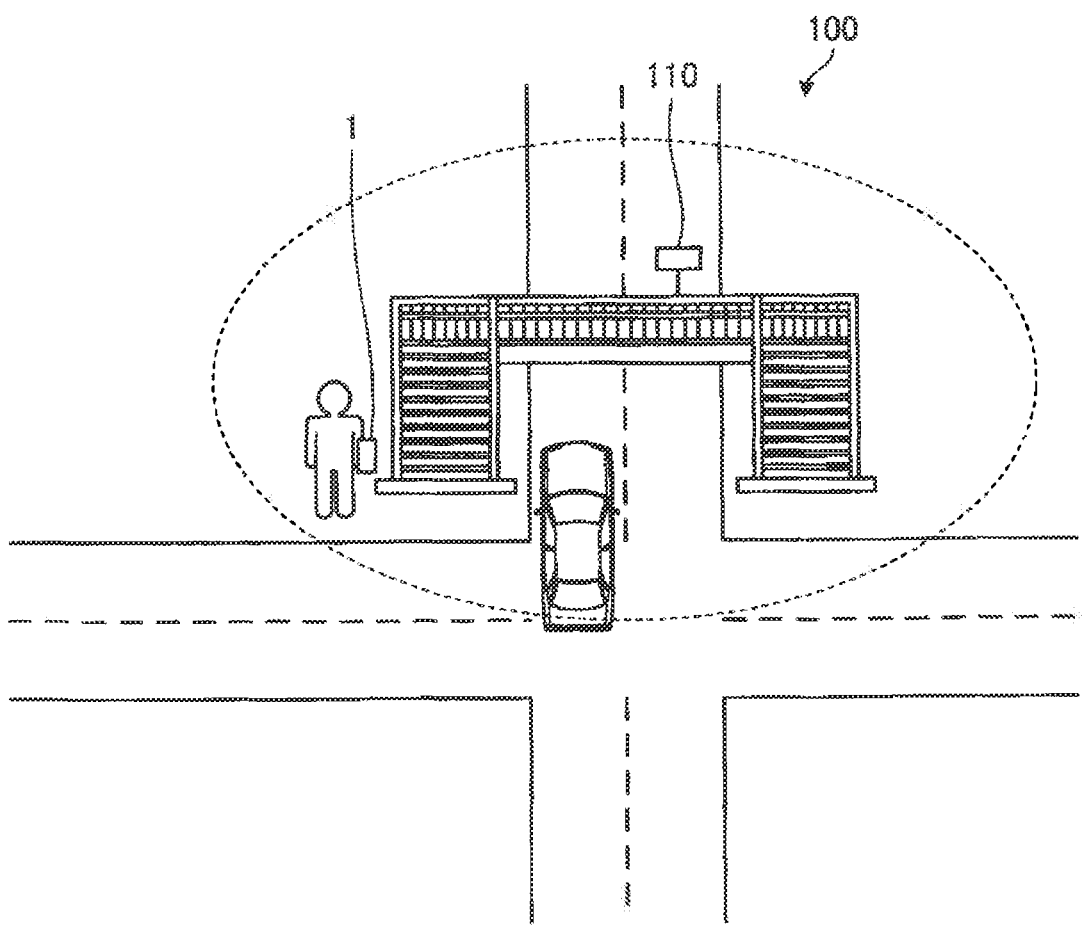
FIG. 1 A schematic diagram illustrating one example of a smartphone and a roadside unit according to a first embodiment.

A whole configuration of a control system 100 including a mobile electronic device according to one embodiment is described using FIG. 1. The mobile electronic device according to one embodiment is a smartphone 1 which is a type of a mobile phone, for example. The smartphone 1 is called as a pedestrian terminal in some cases. The control system 100 comprises a roadside unit 110 and the smartphone 1. FIG. 1 illustrates one roadside unit 110 and one smartphone 1, however, the control system 100 may comprise one or more roadside units 110 and one or more smartphones 1, thus a total number of roadside units 110 and smartphones 1 is not limited. FIG. 1 illustrates a road on which a pedestrian bridge is located.

Figure 2:
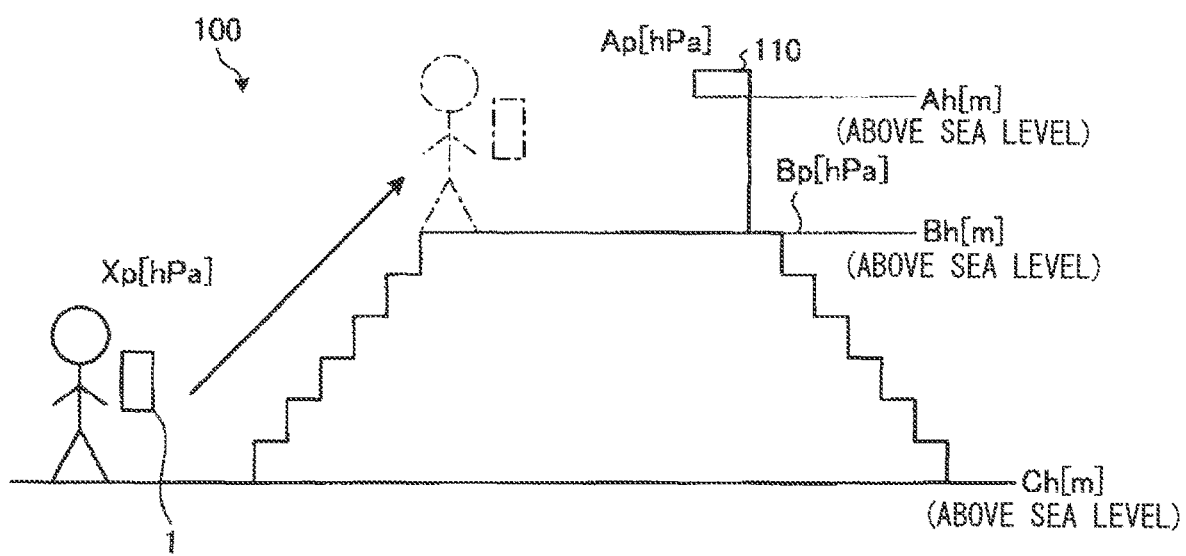
FIG. 2 A schematic diagram illustrating one example of the smartphone and the roadside unit according to the first embodiment.
Figure 3:
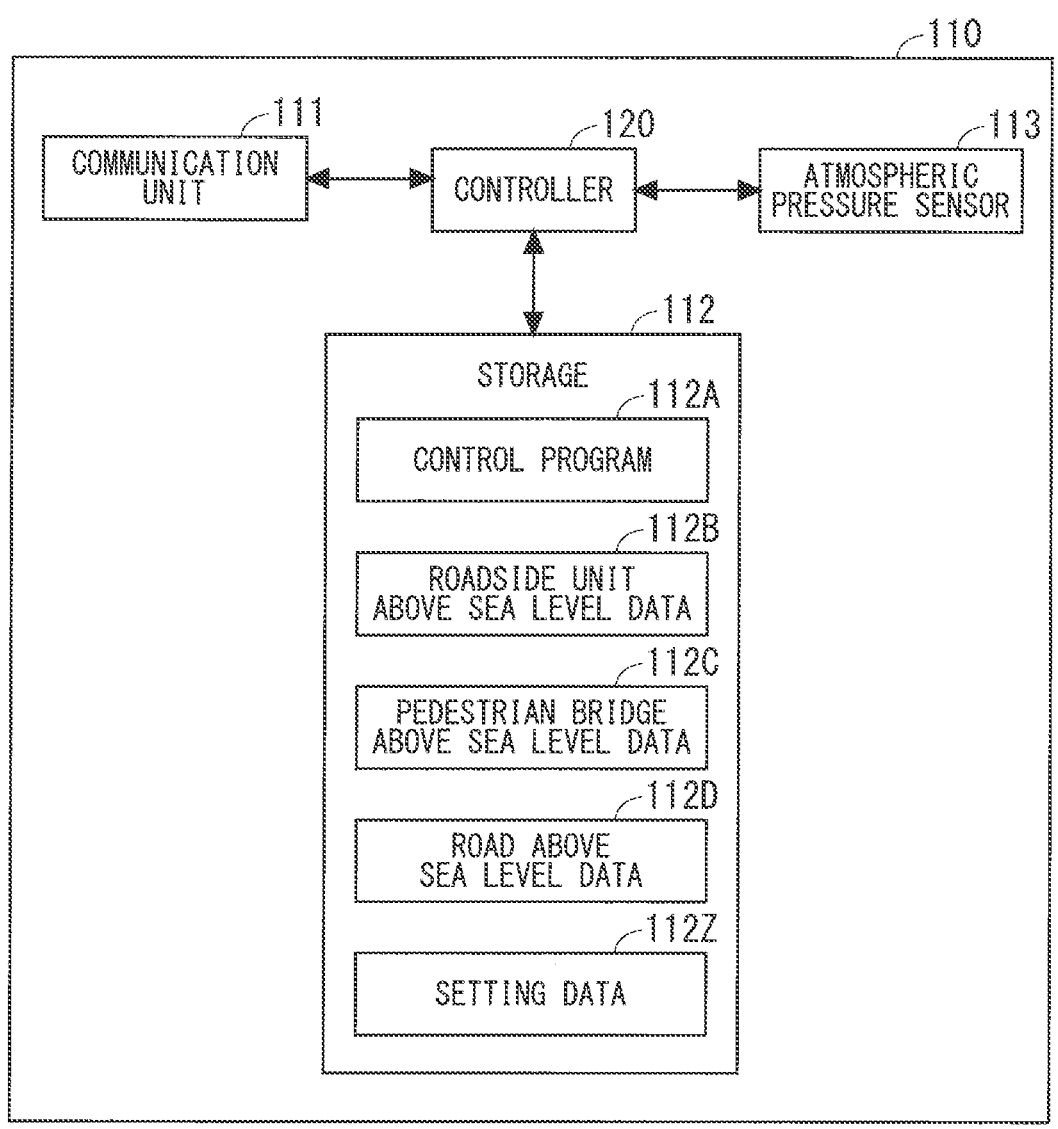
FIG. 3 A block diagram illustrating one example of the roadside unit communicating with the smartphone according to the first embodiment.

A whole configuration of the roadside unit 110 is described using FIG. 1 to FIG. 3. The roadside unit 110 is associated with the pedestrian bridge. The roadside unit 110 is located on the pedestrian bridge as illustrated in FIGS. 1 and 2, for example. The roadside unit 110 may control a traffic light located in an intersection.

The roadside unit 110 can wirelessly output identification information of a subject device. The identification information of the roadside unit 110 is information for identifying the roadside unit 110, and is an identification number specific to the roadside unit 110, for example. The roadside unit 110 can wirelessly output data together with the identification information of the subject device. As illustrated in FIG. 3, the roadside unit 110 comprises a communication unit 111, a storage 112, an atmospheric pressure sensor 113, and a controller 120.

The communication unit 111 can perform a wireless communication. The communication unit 111 supports a wireless communication standard including, for example, Worldwide Interoperability for Microwave Access (WiMAX), IEEE802.11 (including a, b, n, and p), Bluetooth (trademark), Infrared Data Association (IrDA), and Near Field Communication (NFC). The communication unit 111 may support a communication standard for a cellular phone such as 2G, 3G, and 4G. Examples of the communication standard for a cellular phone include Long Term Evolution (LTE), Wideband Code Division Multiple Access (W-CDMA), CDMA2000, Personal Digital Cellular (PDC), Global System for Mobile Communications (GSM) (trademark), and Personal Handy-phone System (PHS). The communication unit 111 may support a single or a plurality of the communication standards described above. The communication unit 111 may support a wire communication such as Ethernet (trademark) or fiber channel.

The communication unit 111 can communicate with the other roadside unit 110 and a traffic light. The communication unit 111 can transmit and receive data to and from a communication device located within a predetermined distance via a near field wireless communication. The communication unit 111 communicates with the smartphone 1 located within a predetermined distance via a near field wireless communication, for example. The communication unit 111 communicates with the communication device mounted on a vehicle located within a predetermined distance via a near field wireless communication. In one embodiment, the communication unit 111 communicates with the smartphone 1 to transmit data including the identification information of the subject device.

The atmospheric pressure sensor 113 can detect an atmospheric pressure value Ap around the roadside unit 110 (see FIG. 2). The atmospheric pressure sensor 113 is located inside a housing not shown of the roadside unit 110, for example. The atmospheric pressures inside and outside the housing are coordinated with each other by a hole through which water does not pass but air passes. Thus, the atmospheric pressure sensor 113 can detect the atmospheric pressure value Ap around the roadside unit 110 while being located inside the housing. A detection result of the atmospheric pressure sensor 113 is input to the controller 120. The detection result of the atmospheric pressure sensor 113 may be input to the controller 120 after filter processing using a low-pass filter, for example.

The storage 112 can store a program and data. The storage 112 is also used as a workspace in which a processing result of the controller 120 is temporarily stored. The storage 112 may include any non-transitory storage medium such as a semiconductor storage medium and a magnetic storage medium. The non-transitory storage medium includes, but not only limited to, an optical disc such as CD (trademark), DVD (trademark), and Blu-ray (trademark), a magneto-optical disk, a magnetic storage medium, a memory card, and a solid-state storage medium. The storage 112 may include a plural types of storage media. The storage 112 may include a combination of a transportable storage medium such as a memory card, an optical disc, and a magneto-optical disk and a reader for the storage medium. The storage 112 may include a storage device used as such as random access memory (RAM) that is used as a temporary storage area.

The program stored in the storage 112 includes a program of executing control for establishing a communication with a communication device located in a predetermined distance and transmitting and receiving data. The data stored in the storage 112 includes, for example, data transmitted to the other communication device such as the identification information of the subject device.

The storage 112 stores, for example, a control program 112A, a roadside unit above sea level data 112B, a pedestrian bridge sea level data 112C, a road above sea level data 112D, and a setting data 112Z.

The roadside unit above sea level data 112B previously associates the identification information of the roadside unit 110 with positional information of the roadside unit 110 and an above sea level Ah [m] of the roadside unit 110 and stores them. In more detail, the roadside unit above sea level data 112B stores the positional information indicating an installation position of the roadside unit 110 by a latitude and a longitude and the above sea level Ah of the roadside unit 110 for each identification information of the roadside unit 110.

The pedestrian bridge above sea level data 112C previously associates the identification information of the pedestrian bridge with positional information of the pedestrian bridge and an above sea level Bh [m] of the pedestrian bridge and stores them. In more detail, the pedestrian bridge above sea level data 112C stores the positional information indicating an installation position of the pedestrian bridge by a latitude and a longitude and the above sea level Bh of the pedestrian bridge for each identification information of the pedestrian bridge.

The road above sea level data 112D previously associates the identification information of the road with positional information of a point on the road where the pedestrian bridge is located and an above sea level Ch [m] of the point and stores them. In more detail, the road above sea level data 112D stores the positional information indicating the point on the road where the pedestrian bridge is located by a latitude and a longitude and the above sea level Ch of the point for each identification information of the road.

The setting data 112Z includes information regarding various types of settings regarding the operation of the roadside unit 110.

The control program 112A can provide functions regarding various types of control to activate the roadside unit 110.

The control program 112A calculates an atmospheric pressure value Bp on the pedestrian bridge based on the atmospheric pressure value Ap detected by the atmospheric pressure sensor 113, the above sea level Ah of the roadside unit 110, the above sea level Bh of the pedestrian bridge, and the above sea level Ch of the point on the road where the pedestrian bridge is located. The atmospheric pressure value Bp on the pedestrian bridge is an atmospheric pressure on a flat portion on a top side of the pedestrian bridge where a pedestrian walks. FIG. 2 illustrates one example of a relationship between the atmospheric pressure values Ap and Bp and the above sea levels Ah, Bh, and Ch.

The controller 120 is an arithmetic processing unit, for example. The arithmetic processing unit includes at least one processor for providing control and processing capability to execute various functions as described in detail below. In accordance with various embodiments, the at least one processor may be executed as a single integrated circuit (IC) or as multiple communicatively coupled IC's and/or discrete circuits. The at least one processor can be executed in accordance with various known techniques.

In one embodiment, the processor includes one or more circuits or units configurable to perform one or more data computing procedures or processes by executing instructions stored in an associated memory, for example. In the other embodiment, the processor may be firmware configurable to perform one or more data computing procedures or processes (a discrete logic component, for example).

In accordance with various embodiments, the processor may comprise one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described below.

The controller 120 includes, but not only limited to, a central processing unit (CPU), a system-on-a-chip (SoC), a micro control unit (MCU), and a field-programmable gate array (FPGA), for example. The controller 120 integrally controls the operation of the roadside unit 110 so as to achieve the various functions.

The controller 120 executes a command included in a program stored in the storage 112 with reference to the data stored in the storage 112 as necessary. Then, the controller 120 controls the function unit in accordance with the data and the command, thereby achieving the various functions.

The roadside unit 110 wirelessly outputs the atmospheric pressure value Bp on the pedestrian bridge via the communication unit 111 together with the identification information of the subject device, for example.

Figure 5:
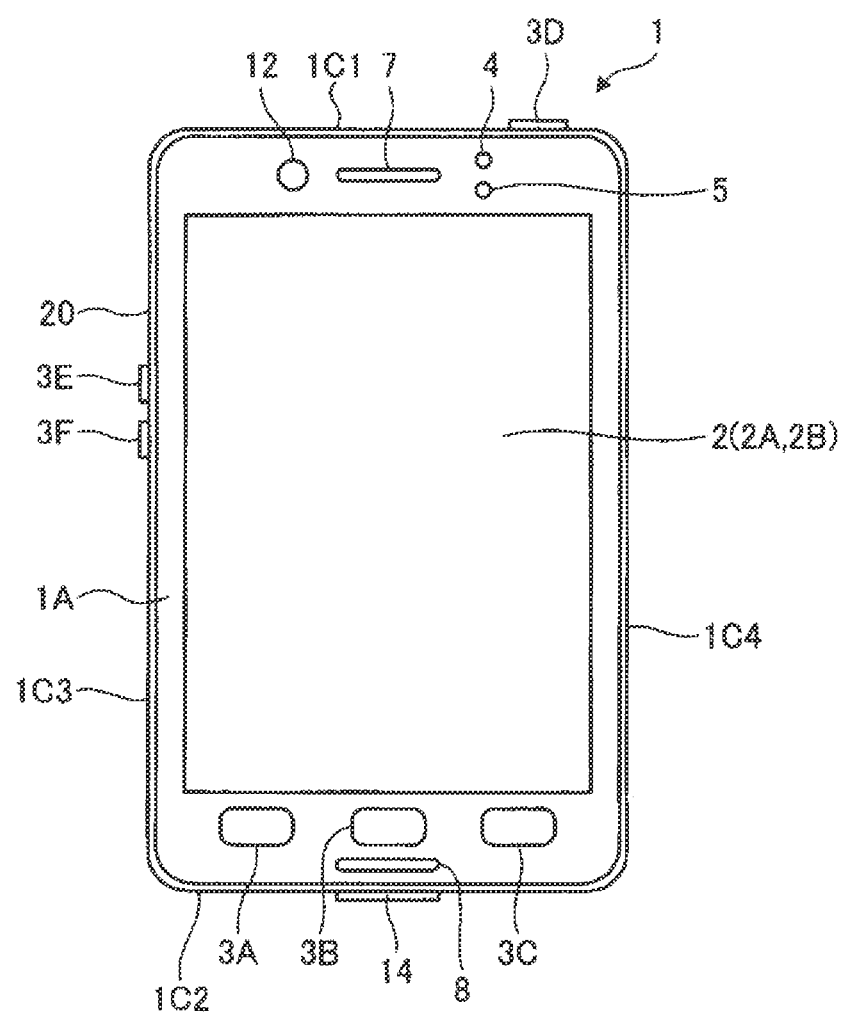
FIG. 5 A front view illustrating one example of the smartphone according to the first embodiment.
Figure 6:
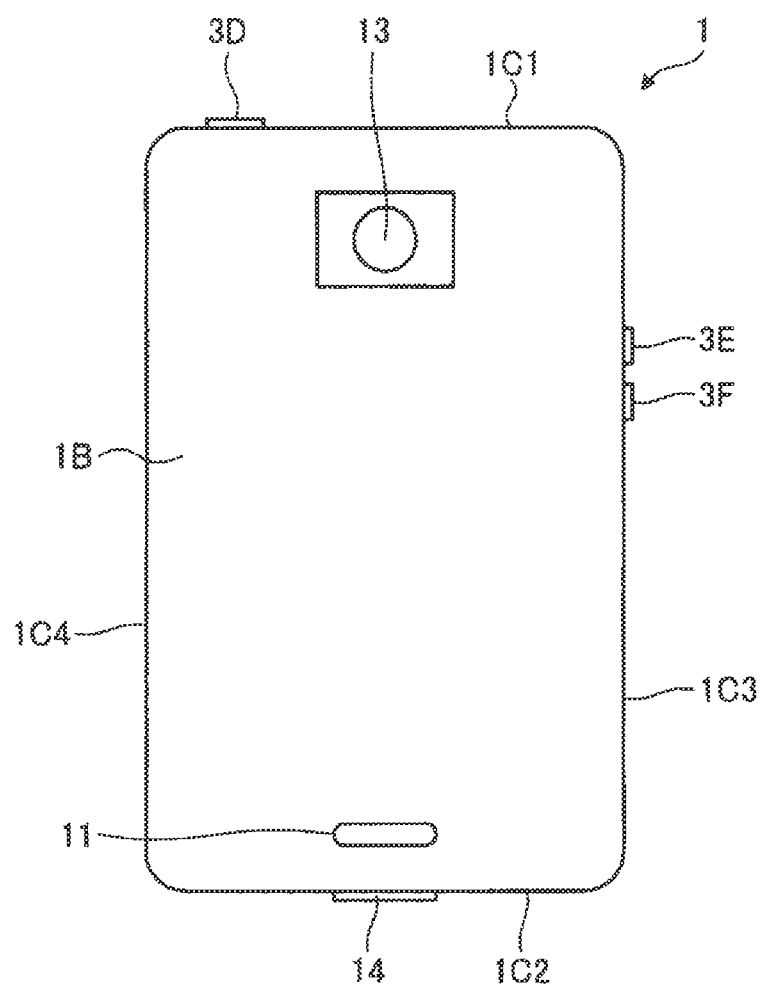
FIG. 6 A back view illustrating one example of the smartphone according to the first embodiment.

A whole configuration of the smartphone 1 according to one embodiment is described with reference to FIG. 4 to FIG. 6. The smartphone 1 comprises a housing 20. The housing 20 comprises a front face 1A, a back face 1B, and side faces 1C1 to 1C4.

The front face 1A is a front surface of the housing 20. The back face 1B is a back surface of the housing 20. The side faces 1C1 to 1C4 are side surfaces connecting the front face 1A and the back face 1B. The side faces 1C1 to 1C4 may not be specified but be collectively referred to as the side face 1C in some cases hereinafter. The configuration of the smartphone 1 illustrated in FIG. 4 to FIG. 6 is an example, and can be appropriately changed within a range of not impairing the scope of the present disclosure.

The smartphone 1 comprises, in the front face 1A, a touchscreen display 2, buttons 3A to 3C, an illuminance sensor 4, a proximity sensor 5, a receiver 7, a microphone 8, and a camera 12. The smartphone 1 comprises, in the back face 1B, a speaker 11 and a camera 13. The smartphone 1 has buttons 3D to 3F and a connector 14 in the side face 1C. The buttons 3A to 3F may not be specified but be collectively referred to as the button 3 in some cases hereinafter.

The touchscreen display 2 has a display 2A and a touchscreen 2B. In the example in FIG. 4, each of the display 2A and the touchscreen 2B has a substantially rectangular shape, however, the shape of each of the display 2A and the touchscreen 2B is not limited thereto. Each of the display 2A and the touchscreen 2B may have any shape such as a square shape or a circular shape. In the example in FIG. 4, the display 2A and the touchscreen 2B are located to overlap with each other, however, the position of the display 2A and the touchscreen 2B is not limited thereto. The display 2A and the touchscreen 2B may be located side by side or separately located, for example. In the example in FIG. 4, a long side of the display 2A is located along a long side of the touchscreen 2B, and a short side of the display 2A is located along a short side of the touchscreen 2B, however, a form of overlapping the display 2A with the touchscreen 2B is not limited thereto. If the display 2A and the touchscreen 2B are located to overlap with each other, one or a plurality of sides of the display 2A may not be located along any side of the touchscreen 2B.

The display 2A includes a display device of a liquid crystal display (LCD), an organic electro-luminescence display (OELD), or an inorganic electro-luminescence display (IELD), for example. The display 2A can display an object such as characters, images, symbols, and graphics, for example.

The touchscreen 2B can detect a contact of a finger, a pen, or a stylus pen, for example, with the touchscreen 2B. The touchscreen 2B can detect a position in the touchscreen 2B where a plurality of fingers, the pen, or the stylus pen, for example, comes in contact. A detection method of the touchscreen 2B may be any method, such as an electrostatic capacitance method, a resistance film method, a surface acoustic wave method (or an ultrasonic method), an infrared method, an electromagnetic induction method, and a load detection method. The description below is based on an assumption that a user comes in contact with the touch screen 2B using his/her finger to operate the smartphone 1 for ease of description.

The smartphone 1 can distinguish an operation (a gesture) performed on the touchscreen 2B based on at least one of a contact detected by the touchscreen 2B, a position where the contact is detected, a change in the position where the contact is detected, an interval of detections of contact, and a total number of times of detection of contact. Examples of the operation performed on the touchscreen 2B include, but not only limited to, touch, long touch, release, swipe, tap, double tap, long tap, drag, flick, pinch-in, and pinch-out.

Figure 7:
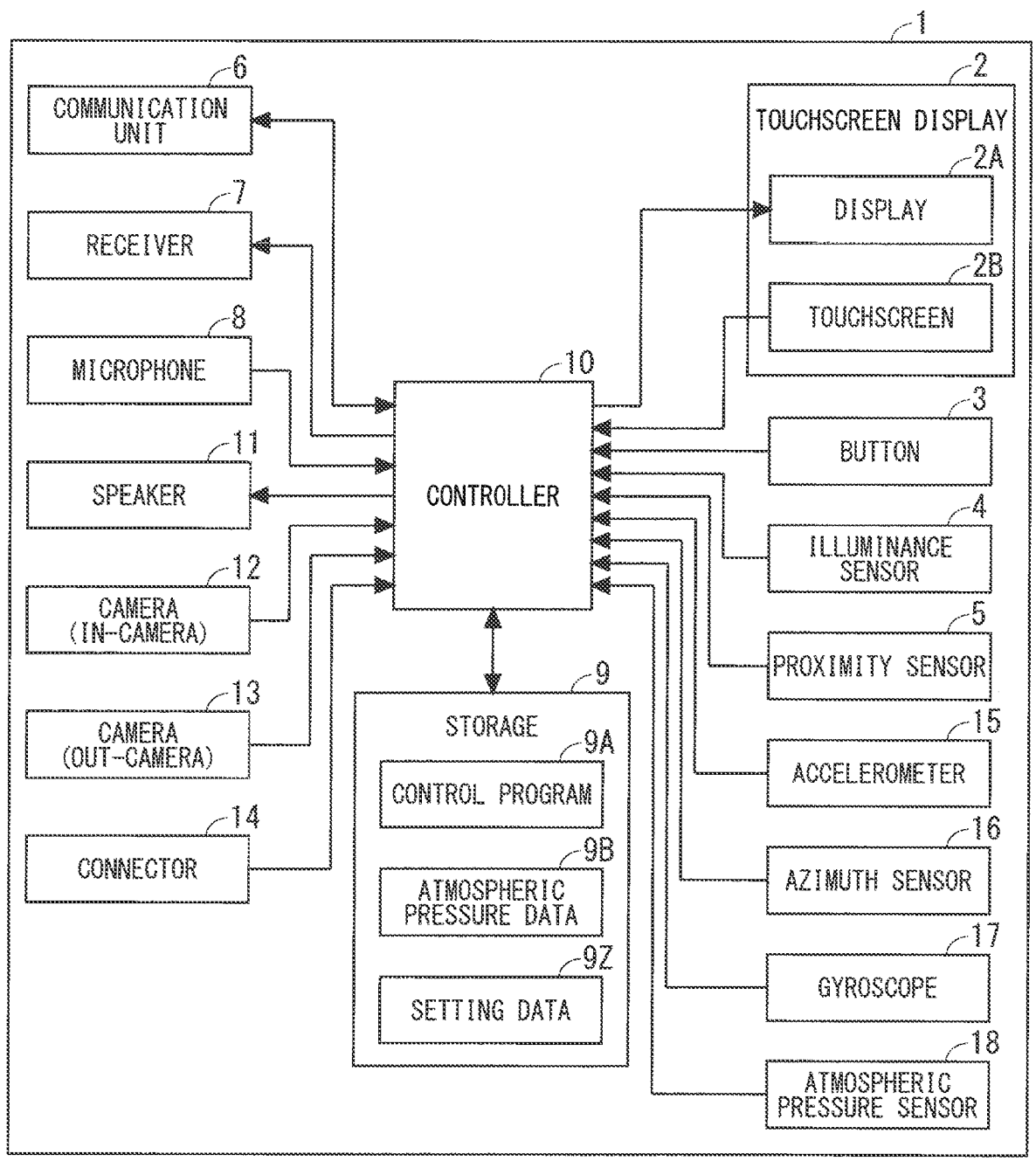
FIG. 7 A block diagram illustrating one example of the smartphone according to the first embodiment.

Next, a functional configuration of the smartphone 1 according to one embodiment is described using FIG. 7. The configuration of the smartphone 1 illustrated in FIG. 7 is an example, and can be appropriately changed within a range of not impairing the scope of the present disclosure.

The smartphone 1 comprises the touchscreen display 2, the button 3, the illuminance sensor 4, the proximity sensor 5, a communication unit (a communication part) 6, the receiver 7, the microphone 8, a storage 9, a controller 10, the speaker 11, the camera 12, the camera 13, the connector 14, an accelerometer 15, an azimuth sensor 16, a gyroscope 17, and an atmospheric pressure sensor (a position detector) 18.

The touchscreen display 2 comprises the display 2A and the touchscreen 2B as described above. The display 2A can display characters, images, symbols, or graphics, for example. The touchscreen 2B can detect contact. The touchscreen 2B can output information regarding the detected contact to the controller 10.

The user operates the button 3. The button 3 has buttons 3A to 3F. The controller 10 cooperates with the button 3, thereby being able to detect an operation performed on the button 3. Examples of the operation performed on the button 3 include, but not only limited to, click, double click, triple click, push, and multi push.

Each of the buttons 3A to 3C is a home button, a back button, or a menu button, for example. The button 3D is a power on/off button of the smartphone 1, for example.

The button 3D may double as a sleep/sleep-cancel button. The buttons 3E and 3F are volume buttons, for example.

The illuminance sensor 4 can detect illuminance of light around the smartphone 1. The illuminance indicates intensity, brightness, or luminance of light. The illuminance sensor 4 is used for adjusting luminance of the display 2A, for example. The proximity sensor 5 can detect a presence of an object near the proximity sensor 5 in a non-contact manner. The proximity sensor 5 can detect the presence of the object based on a change in a magnetic field or a change in a returning time period of a reflected wave of an ultrasonic wave. The proximity sensor 5 can detect, for example, a face approaching the touchscreen display 2. The illuminance sensor 4 and the proximity sensor 5 may be made up as one sensor. The illuminance sensor 4 may be used as the proximity sensor.

The communication unit 6 can perform a wireless communication. In one embodiment, the communication unit 6 comprises at least a function of a short-range wireless communication. A communication system supported by the communication unit 6 is a wireless communication standard. The communication unit 6 supports a communication standard for a cellular phone such as 2G, 3G, 4G, and 5G, for example. Examples of the communication standard for a cellular phone include LTE, W-CDMA, CDMA2000, PDC, GSM (trademark), and PHS. The communication unit 6 may support a wireless communication standard including, for example, WiMAX, IEEE802.11, Bluetooth (trademark), IrDA, and NFC. The communication unit 6 may support one or a plurality of the communication standards described above.

The communication unit 6 may support a wire communication. The wire communication includes, for example, Ethernet (trademark) and fiber channel.

In one embodiment, the communication unit 6 supports a communication standard for enabling a communication with the roadside unit 110. For example, the smartphone 1 communicates with the roadside unit 110 via the communication unit 6, thereby obtaining information of the roadside unit 110. In one embodiment, the communication unit 6 may support a communication standard for enabling a communication with a communication device mounted on a vehicle. For example, the smartphone 1 may communicate with the vehicle via the communication unit 6, thereby obtaining information of the vehicle.

The communication unit 6 obtains the atmospheric pressure value Bp on the pedestrian bridge from the roadside unit 110 located on the pedestrian bridge.

The receiver 7 and the speaker 11 are sound output units. The receiver 7 and the speaker 11 can output a sound signal transmitted from the controller 10 as a sound. The receiver 7 is used for outputting a voice of an intended party during a voice communication. The speaker 11 is used for outputting a ringtone and music, for example. One of the receiver 7 and the speaker 11 may double as the other's function.

The microphone 8 is a sound input unit. The microphone 8 can convert, for example, a voice of the user into a sound signal and transmit the sound signal to the controller 10.

The storage 9 can store a program and data. The storage 9 is also used as a workspace in which a processing result of the controller 10 is temporarily stored. The storage 9 may include any non-transitory storage medium such as a semiconductor storage medium and a magnetic storage medium. The storage 9 may include a plural types of storage media. The storage 9 may include a combination of a transportable storage medium such as a memory card, an optical disc, and a magneto-optical disk and a reader for the storage medium. The storage 9 may include a storage device used as such as RAM that is used as a temporary storage area.

A part or all of the programs and data stored in the storage 9 may be downloaded from the other device via a communication performed by the communication unit 6. A part or all of the programs and data stored in the storage 9 may be stored in a reader-readable non-transitory storage medium included in the storage 9. A part or all of the programs and data stored in the storage 9 may be stored in a reader-readable non-transitory storage medium connected to a connector not shown.

The program stored in the storage 9 includes an application executed in foreground or background and a control program assisting an operation of the application. The application makes the display 2A display a screen, and makes the controller 10 execute processing in accordance with a gesture detected via the touchscreen 2B. The control program includes OS, for example.

The storage 9 stores, for example, a control program 9A, atmospheric pressure data 9B, and setting data 9Z.

The setting data 9Z includes information regarding various types of settings regarding the operation of the smartphone 1.

The control program 9A provides functions regarding various types of control to activate the smartphone 1. The control program 9A controls the communication unit 6, the receiver 7, and the microphone 8, for example, thereby making the smartphone 1 achieve a voice communication. The functions provided by the control program 9A include a function of controlling information displayed on the display 2A. The functions provided by the control program 9A include a function of performing various types of control such as changing information displayed on the display 2A in accordance with the operation detected via the touchscreen 2B. The function provided by the control program 9A may be used in combination with a function such as a mail application provided by the other program.

If a position of the subject device with respect to the pedestrian bridge satisfies a predetermined condition, the control program 9A makes the smartphone 1 correct an offset value C1o of an atmospheric pressure value Xp of an atmospheric pressure around the subject device detected by the atmospheric pressure sensor 18 based on the atmospheric pressure value Bp on the pedestrian bridge obtained from the roadside unit 110. In more detail, the control program 9A makes the smartphone 1 calculate a difference $\Delta$XBp between the atmospheric pressure value Bp on the pedestrian bridge and the atmospheric pressure value Xp around the subject device on an uppermost part of the pedestrian bridge (referred to as "the atmospheric pressure value Xp around the subject device on the pedestrian bridge" hereinafter) which is a detection result of the atmospheric pressure sensor 18. The calculated difference $\Delta$XBp is an error of the atmospheric pressure sensor 18.

Then, the control program 9A makes the smartphone 1 add a value obtained by multiplying the calculated difference $\Delta$XBp by a predetermined weighting coefficient to the offset value C1o, thereby calculating a correction value of the offset value C1o.

Since the calculated difference $\Delta$XBp is multiplied by the predetermined weighting coefficient, a significant increase in the error can be suppressed even if an irregular measurement is performed.

The weighting coefficient is determined by the control program 9A based on the difference $\Delta$XBp between the atmospheric pressure value Bp on the pedestrian bridge and the atmospheric pressure value Xp around the subject device on the pedestrian bridge. The weighting coefficient is determined to be zero when the difference $\Delta$XBp is equal to or larger than the predetermined value, for example, equal to or larger than 1[hPa]. The weighting coefficient is determined to be 1/10, for example when the difference $\Delta$XBp is smaller than the predetermined value.

In one embodiment, the control program 9A can calculate the correction value of the offset value C1o from the following mathematical expression 1 when the difference $\Delta XBp$ is smaller than the predetermined value.

$$C1o+(1/10)\cdot\Delta XBp \qquad (1)$$

In one embodiment, the control program 9A can calculate a corrected atmospheric pressure value Xpa around the subject device based on the correction value of the offset value C1o from the following mathematical expression 2.

$$Xpa=Xp-(C1o+(1/10)\cdot\Delta XBp) \qquad (2)$$

The atmospheric pressure data 9B includes data of the value of the atmospheric pressure value Xp around the subject device which is the detection result of the atmospheric pressure sensor 18.

The controller 10 is an arithmetic processing unit. The arithmetic processing unit includes at least one processor for providing control and processing capability to execute various functions as described in detail below. The description on the processor included in the controller 120 of the roadside unit 110 described above is also applied to the processor included in the controller 10. In one embodiment, the arithmetic processing unit includes, but not only limited to, a CPU, a SoC, a MCU, and a FPGA, for example. The controller 10 integrally controls the operation of the smartphone 1 so as to achieve the various functions.

The controller 10 can execute a command included in a program stored in the storage 9 with reference to the data stored in the storage 9 as necessary. Then, the controller 10 controls a function unit in accordance with the data and the command, thereby achieving the various functions. The function unit may include at least one of the display 2A, the communication unit 6, the receiver 7, and the speaker 11, for example, but is not limited thereto. The controller 10 may change the control in accordance with the detection result of a detector in some cases. The detector comprises, but not only limited to, the touchscreen 2B, the button 3, the illuminance sensor 4, the proximity sensor 5, the microphone 8, the camera 12, the camera 13, the accelerometer 15, the azimuth sensor 16, the gyroscope 17, and the atmospheric pressure sensor 18, for example.

The controller 10 detects the operation performed on the smartphone 1. Specifically, the controller 10 cooperates with the touchscreen 2B, thereby being able to detect an operation performed on the touchscreen 2B (touchscreen display 2).

The controller 10 executes the control program 9A, for example, thereby being able to execute the various types of control such as changing information displayed on the display 2A in accordance with the operation detected via the touchscreen 2B.

The camera 12 is an in-camera capable of taking an image of an object facing the front face 1A. The camera 13 is an out-camera capable of taking an image of an object facing the back face 1B.

The connector 14 is a terminal to which the other device is connected. The connector 14 may be a general terminal such as Universal Serial Bus (USB), High-Definition Multimedia Interface (HDMI) (trademark), Light Peak (Thunderbolt (trademark)), and an earphone-microphone connector. The connector 14 may be a dedicated terminal such as a dock connector. Examples of a device to be connected to the connector 14 include, but not only limited to, an external storage, a speaker, and a communication device.

The accelerometer 15 can detect information indicating a direction and a magnitude of acceleration acting on the smartphone 1. The azimuth sensor 16 can detect information indicating a direction of earth magnetism. The gyroscope 17 can detect information of an angle and an angular speed of the smartphone 1. The detection results of the accelerometer 15, the azimuth sensor 16, and the gyroscope 17 are used in combination with each other to detect a change in a position and a posture of the smartphone 1, for example.

In the example illustrated in FIG. 7, the smartphone 1 comprises the three types of sensors to detect the position and the posture, however, the smartphone 1 may not comprise at least one of these sensors. Alternatively, the smartphone 1 may comprise the other type of sensor to detect at least one of the position and the posture.

The atmospheric pressure sensor 18 detects the atmospheric pressure value Xp around the subject device. The atmospheric pressure sensor 18 has accuracy capable of detecting a change of the atmospheric pressure value Xp associated with a movement of approximately tens of meters [m] to several meters [m] of the subject device. The atmospheric pressure sensor 18 is located inside the housing 20. The atmospheric pressures inside and outside the housing 20 are coordinated with each other by a hole through which water does not pass but air passes. Thus, the atmospheric pressure sensor 18 can detect the atmospheric pressure value Xp around the subject device while being located inside the housing 20. In one embodiment, the detection accuracy of the atmospheric pressure sensor 18 is lower than that of the atmospheric pressure sensor 113 of the roadside unit 110. The atmospheric pressure sensor 18 generates an offset in the detected atmospheric pressure value Xp around the subject device. The offset value C1o described above indicates this offset. The offset generated in the atmospheric pressure sensor 18 is caused by a temperature and weather, for example. A detection result of the atmospheric pressure sensor 18 is input to the controller 10. The detection result of the atmospheric pressure sensor 18 may be input to the controller 10 after filter processing using a low-pass filter, for example.

Figure 8:
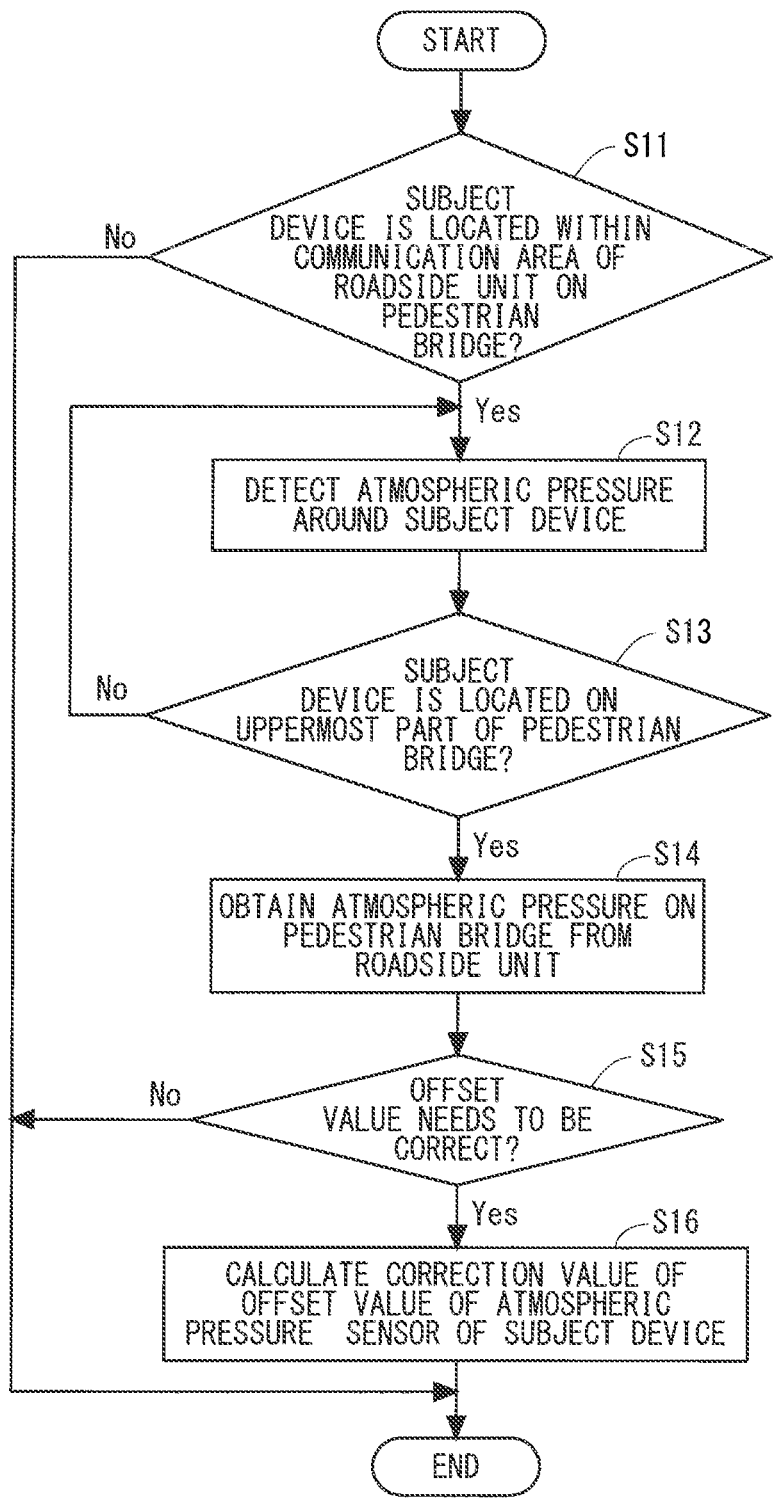
FIG. 8 A flow chart illustrating one example of control performed by the smartphone according to the first embodiment.

Next, a method of controlling the smartphone 1, the control program 9A, and an action thereof are described using FIG. 8.

The smartphone 1 executes the control program 9A stored in the storage 9 using the controller 10, thereby being able to achieve the function illustrated in FIG. 8. The controller 10 may execute a processing procedure of the other function in parallel with a processing procedure illustrated in FIG. 8. A series of processing illustrated in FIG. 8 is executed repeatedly at regular or irregular intervals, for example.

The controller 10 determines whether or not the subject device is located within a communication area of the roadside unit 110 on the pedestrian bridge (Step S11). In more detail, if the subject device gets close to within the predetermined distance from the roadside unit 110, the controller 10 receives information which the roadside unit 11 wirelessly outputs. In other words, if the controller 10 detects the roadside unit 110 which can communicate based on the detection result of the sensor, the controller 10 receives the information which the roadside unit 110 wirelessly outputs. The term of "the roadside unit 100 which can communicate" means that the roadside unit 100 from which a signal enabling a transmission and reception of data reaches. The controller 10 may determine whether or not the subject device gets close to within the predetermined distance from the roadside unit 110 in accordance with the determination whether or not a received signal strength of a wireless signal being output from the roadside unit 110 is equal to or larger than a predetermined value. Specifically, the controller 10 determines that the subject device is located within the communication area of the roadside unit 110 on the pedestrian bridge (Yes in Step S11) when the received signal strength of the wireless signal being output from the roadside unit 110 is equal to or larger than the predetermined value. The controller 10 determines that the subject device is not located within the communication area of the roadside unit 110 on the pedestrian bridge (No in Step S11) when the received signal strength of the wireless signal being output from the roadside unit 110 is smaller than the predetermined value.

If it is determined to be Yes in Step S11, the controller 10 detects the atmospheric pressure around the subject device (Step S12). In one embodiment, the controller 10 turns on the atmospheric pressure sensor 18. Then, the controller 10 obtains the atmospheric pressure value Xp around the subject device which is the detection result of the atmospheric pressure sensor 18. The controller 10 stores the atmospheric pressure value Xp around the subject device as the atmospheric pressure data 9B in the storage 9. The controller 10 repeatedly obtains the atmospheric pressure value Xp around the subject device from the atmospheric pressure sensor 18.

After Step S11, the controller 10 determines whether or not the subject device is located on the uppermost part of the pedestrian bridge (Step S13). In more detail, the controller 10 determines whether or not the subject device is located on the uppermost part of the pedestrian bridge based on the atmospheric pressure value Xp around the subject device which is repeatedly obtained. In other words, the controller 10 determines whether or not the user walks on the flat portion of the pedestrian bridge based on the change of the atmospheric pressure value Xp around the subject device detected by the atmospheric pressure sensor 18.

Described is the change of the atmospheric pressure value Xp around the subject device in a case where the user crosses the pedestrian bridge. When the user walks up steps of the pedestrian bridge, the atmospheric pressure value Xp around the subject device decreases in a step-like pattern. When the user climbs the pedestrian bridge using an elevator or a ramp, the atmospheric pressure value Xp around the subject device linearly decreases. When the user walks on the flat portion of the uppermost part of the pedestrian bridge, the atmospheric pressure value Xp around the subject device is substantially maintained constant. When the user moves down the steps of the pedestrian bridge, the atmospheric pressure value Xp around the subject device increases in a step-like pattern. When the user moves down the pedestrian bridge using an elevator or a ramp, the atmospheric pressure value Xp around the subject device linearly increases. As described above, if the change of the atmospheric pressure value Xp around the subject device transitions from the decreasing state to the substantially constant state, it can be determined that the user walks on the flat portion of the uppermost part of the pedestrian bridge, in other words, the subject device is located on the uppermost part of the pedestrian bridge.

If the change of the atmospheric pressure value Xp around the subject device transitions from the decreasing state to the substantially constant state, the controller 10 determines that the subject device is located on the uppermost part of the pedestrian bridge (Yes in Step S13). If the change of the atmospheric pressure value Xp around the subject device transitioned from the decreasing state to the substantially constant state and then a predetermined period of time has passed while maintaining the change of the atmospheric pressure value Xp with the substantially constant state, the controller 10 may determine that the subject device is located on the uppermost part of the pedestrian bridge. If the change of the atmospheric pressure value Xp around the subject device is in the increasing state or the decreasing state, the controller 10 determines that the subject device is not located on the uppermost part of the pedestrian bridge (No in Step S13).

The controller 10 obtains the atmospheric pressure value Bp on the pedestrian bridge from the roadside unit 110 (Step S14). In one embodiment, if the controller 10 determines that the user walks on the flat portion of the uppermost part of the pedestrian bridge in Step S13, the controller 10 obtains the atmospheric pressure value Bp on the pedestrian bridge from the roadside unit 110.

After Step S14, the controller 10 determines that whether or not the offset value C1o of the atmospheric pressure sensor 18 needs to be corrected (Step S15). In more detail, the controller 10 determines whether or not the offset value C1o of the atmospheric pressure sensor 18 needs to be corrected based on the atmospheric pressure value Xp around the subject device on the pedestrian bridge and the atmospheric pressure value Bp on the pedestrian bridge obtained from the roadside unit 110. For example, if the difference ΔXBp between the atmospheric pressure value Xp around the subject device on the pedestrian bridge and the atmospheric pressure value Bp on the pedestrian bridge is equal to or larger than a predetermined value, the controller 10 determines that the offset value C1o of the atmospheric pressure sensor 18 needs to be corrected (Yes in Step S15). For example, if the difference ΔXBp is equal to or larger than a first predetermined value and smaller than a second predetermined value, which is larger than the first predetermined value, the controller 10 may determine that the offset value C1o of the atmospheric pressure sensor 18 needs to be corrected (Yes in Step S15). The above processing is performed not to correct the offset value C1o of the atmospheric pressure sensor 18 because if the difference ΔXBp is equal to or larger than the second predetermined value, in other words, if the difference ΔXBp is larger than an assumed value, the atmospheric pressure value Xp around the subject device on the pedestrian bridge or the atmospheric pressure value Bp on the pedestrian bridge may be an invalid value. For example, if the difference ΔXBp is smaller than the predetermined value (or the first predetermined value), the controller 10 determines that the offset value C1o of the atmospheric pressure sensor 18 needs not be corrected (No in Step 15).

If it is determined to be Yes in Step S15, the controller 10 calculates the correction value of the offset value C1o of the atmospheric pressure sensor 18 of the subject device (Step S16). In more detail, the controller 10 calculates the correction value of the offset value C1o of the atmospheric pressure sensor 18 based on the atmospheric pressure value Bp on the pedestrian bridge. The controller 10 determines the weighting coefficient based on the difference ΔXBp. The controller 10 adds the value obtained by multiplying the difference ΔXBp by the determined weighting coefficient to the offset value C1o, thereby calculating the correction value of the offset value C1o.

In this manner, the controller 10 calculates the correction value of the offset value C1o of the atmospheric pressure sensor 18 based on the atmospheric pressure value Bp on the pedestrian bridge to perform the correction on the atmospheric pressure sensor 18.

According to the embodiment described above, the smartphone 1 can correct the offset value C1o of the atmospheric pressure sensor 18 based on the atmospheric pressure value Bp on the pedestrian bridge obtained from the roadside unit 110. Then, the smartphone 1 can calculate the corrected atmospheric pressure value Xpa around the subject device based on the correction value of the offset value C1o using the mathematical expression 2. Accordingly, the smartphone 1 can obtain the atmospheric pressure value Xp around the subject device more accurately using the atmospheric pressure sensor 18. As described above, the smartphone 1 can reduce the error of the detection result in the atmospheric pressure sensor 18.

The smartphone 1 adds the value obtained by multiplying the difference $\Delta XBp$ by the predetermined weighting coefficient to the offset value C1o, thereby calculating the correction value of the offset value C1o. Accordingly, even if the atmospheric pressure value Bp on the pedestrian bridge or the atmospheric pressure value Xp around the subject device on the pedestrian bridge is obtained by an irregular measurement, the smartphone 1 can reduce a possibility of a significant increase in the error. The smartphone 1 may directly add the difference $\Delta XBp$ to the offset value C1o without using the weighting coefficient, thereby calculating the correction value of the offset value C1o.

Even if the user does not perform a maintenance including an update of the application, for example, the smartphone 1 can correct the offset value C1o of the atmospheric pressure sensor 18 based on the atmospheric pressure value Bp on the pedestrian bridge obtained from the roadside unit 110 every time the user having the subject device crosses the pedestrian bridge. As described above, the smartphone 1 can correct the offset value C1o of the atmospheric pressure sensor 18 regardless of the operation of the user.

It is preferable that the smartphone 1 turns on the atmospheric pressure sensor 18 only when the smartphone 1 enters the communication area of the roadside unit 110 on the pedestrian bridge, and detects the atmospheric pressure around the subject device. Accordingly, the smartphone 1 can reduce a consumed power of the subject device compared with a case of constantly detecting the atmospheric pressure around the subject device using the atmospheric pressure sensor 18.

Second Embodiment

Figure 9:
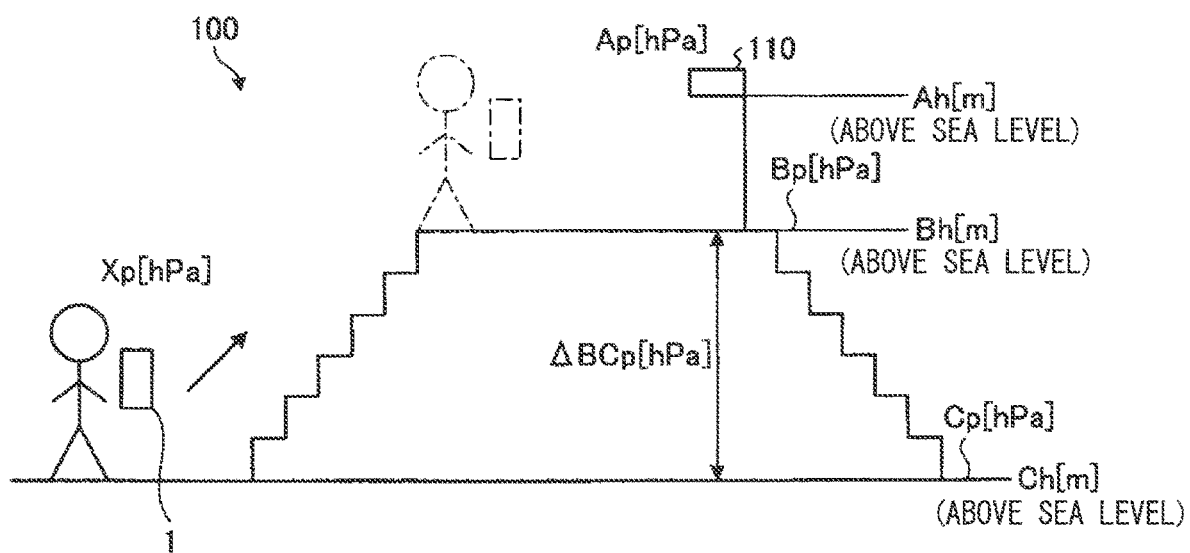
FIG. 9 A schematic diagram illustrating one example of a smartphone and a roadside unit according to a second embodiment.
Figure 10:
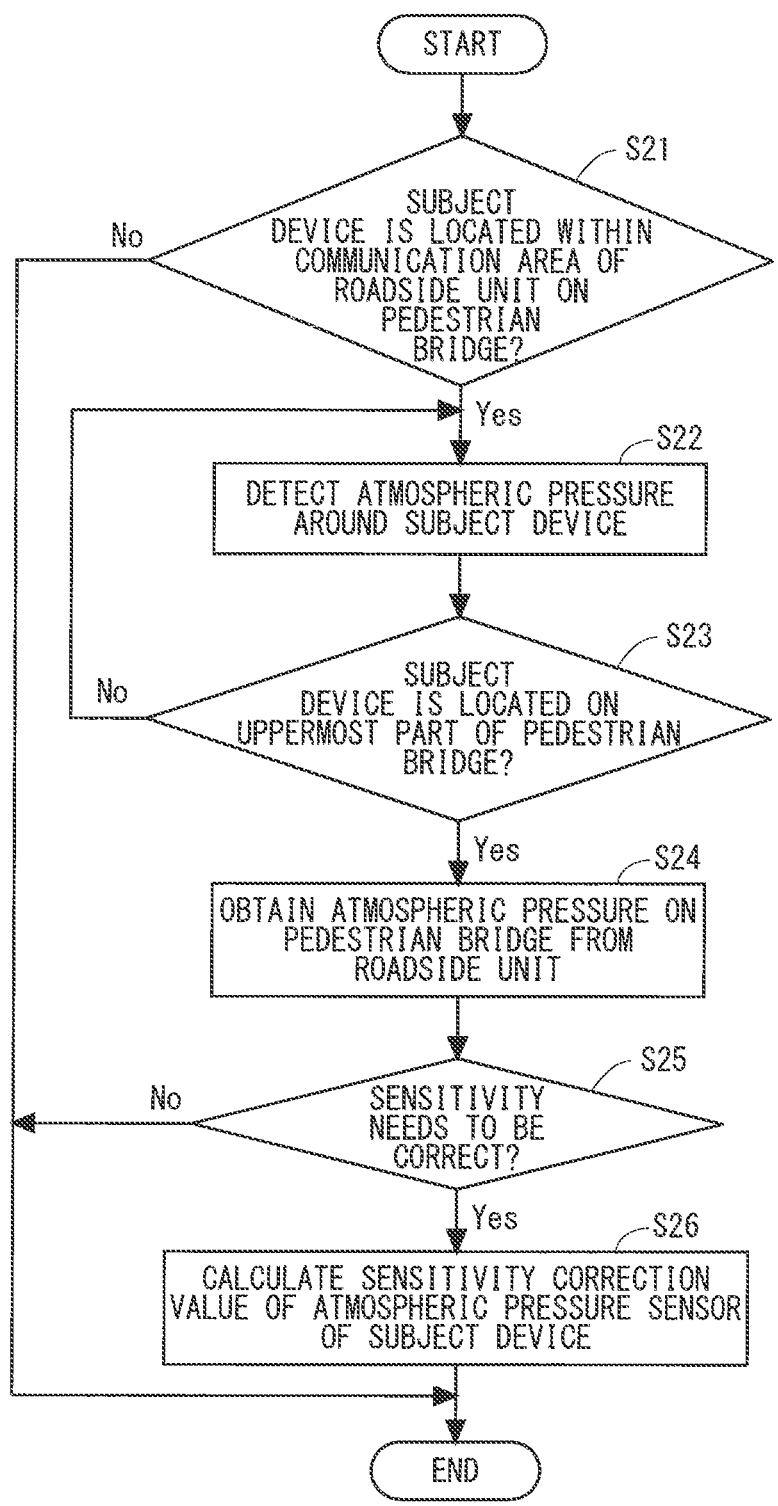
FIG. 10 A flow chart illustrating one example of control performed by the smartphone according to the second embodiment.

Described using FIG. 9 and FIG. 10 is the control system 100 including the smartphone 1 according to one embodiment. A basic configuration of the control system 100 is similar to that of the control system 100 of the first embodiment. In the following description, the same reference numerals or the corresponding reference numerals are be assigned to the constituent elements similar to that of the control system 100, and the detail description thereof is omitted. One embodiment is different from the first embodiment in that a sensitivity correction value (a correction value) C1s for correcting sensitivity of the atmospheric pressure sensor 18 of the smartphone 1 is calculated in the controller 10.

The control program 112A of the roadside unit 110 makes the roadside unit 110 calculate an atmospheric pressure value Cp of a road under the pedestrian bridge based on the atmospheric pressure value Ap detected by the atmospheric pressure sensor 113, the above sea level Ah of the roadside unit 110, the above sea level Bh of the pedestrian bridge, and the above sea level Ch of the point on the road where the pedestrian bridge is located.

The roadside unit 110 wirelessly outputs the atmospheric pressure value Bp on the pedestrian bridge and the atmospheric pressure value Cp of the road via the communication unit 111 together with the identification information of the subject device, for example.

If a position of the subject device with respect to the pedestrian bridge satisfies a predetermined condition, the control program 9A makes the smartphone 1 calculate the sensitivity correction value C1s of the atmospheric pressure sensor 18 based on the atmospheric pressure value Bp on the pedestrian bridge obtained from the roadside unit 110 and the atmospheric pressure value Cp or the road. In more detail, the control program 9A makes the smartphone 1 calculate the sensitivity correction value C1s of the atmospheric pressure sensor 18 based on the atmospheric pressure value Bp on the pedestrian bridge, the atmospheric pressure value Cp of the road, and a variation $\Delta Xp$ of the atmospheric pressure value Xp around the subject device at a time of climbing to the uppermost part of the pedestrian bridge from the road.

Herein, a difference between the atmospheric pressure value Bp on the pedestrian bridge and the atmospheric pressure value Cp of the road is referred to as a reference variation $\Delta BCp$. The reference variation $\Delta BCp$ is considered to be a value which the variation $\Delta Xp$ of the atmospheric pressure value Xp around the subject device is to be at the time of climbing to the uppermost part of the pedestrian bridge from the road. A difference between the reference variation $\Delta BCp$ and the variation $\Delta Xp$ of the atmospheric pressure value Xp around the subject device is a sensitivity error of the atmospheric pressure sensor 18.

In one embodiment, the control program 9A can calculate a corrected atmospheric pressure value Xpa around the subject device, on which the sensitivity correction is performed, from the following mathematical expression 3.

$$Xpa = Xp * C1s \qquad (3)$$

The sensitivity correction value C1s can be calculated from the following mathematical expression 4.

$$C1s = \Delta BCp / \Delta Xp \qquad (4)$$

Next, a method of controlling the smartphone 1, the control program 9A, and an action thereof are described using FIG. 10. A series of processing illustrated in FIG. 10 is executed repeatedly at regular or irregular intervals, for example. Processing of Step S21 to Step S24 is similar to that of Step S11 to Step S14 of the flow chart illustrated in FIG. 8.

After Step S24, the controller 10 determines whether or not the sensitivity of the atmospheric pressure sensor 18 needs to be corrected (Step S25). In more detail, the controller 10 determines whether or not the sensitivity of the atmospheric pressure sensor 18 needs to be corrected based on the variation $\Delta Xp$ of the atmospheric pressure value Xp around the subject device, which is the detection result of the atmospheric pressure sensor 18, and the atmospheric pressure value Bp on the pedestrian bridge obtained from the roadside unit 110 and the atmospheric pressure value Cp of the road. For example, if the sensitivity error, which is the difference between the reference variation $\Delta BCp$ which is the difference between the atmospheric pressure value Bp on the pedestrian bridge and the atmospheric pressure value Cp of the road and the variation $\Delta Xp$ of the atmospheric pressure value Xp around the subject device, is equal to or larger than a predetermined value, the controller 10 determines that the sensitivity of the atmospheric pressure sensor 18 needs to be corrected (Yes in Step S25). Alternatively, for example, if the sensitivity error is equal to or larger than the first predetermined value and smaller than the second predetermined value, which is larger than the first predetermined value, the controller 10 may determine that the sensitivity of the atmospheric pressure sensor 18 needs to be corrected (Yes in Step S25). The above processing is performed not to correct the sensitivity of the atmospheric pressure sensor 18 because if the sensitivity error is equal to or larger than the second predetermined value, in other words, if the sensitivity error is larger than an assumed value, the atmospheric pressure value Xp around the subject device on the pedestrian bridge or the atmospheric pressure value Bp on the pedestrian bridge may be an invalid value. For example, if the sensitivity error is smaller than the predetermined value, the controller 10 determines that the sensitivity of the atmospheric pressure sensor 18 needs not be corrected (No in Step 25).

If it is determined to be Yes in Step S25, the controller 10 calculates the sensitivity correction value C1s of the atmospheric pressure sensor 18 of the subject device (Step S26). In more detail, the controller 10 calculates the sensitivity correction value C1s of the subject device based on the difference between the variation ΔXp of the atmospheric pressure value Xp around the subject device and the reference variation ΔBCp.

In this manner, the controller 10 calculates the sensitivity correction value C1s of the atmospheric pressure sensor 18 based on the atmospheric pressure value Bp on the pedestrian bridge obtained from the roadside unit 110 and the atmospheric pressure value Cp of the road to perform the correction on the atmospheric pressure sensor 18 using the calculated the sensitivity correction value C1s.

According to the embodiment described above, the smartphone 1 can calculate the sensitivity correction value C1s of the atmospheric pressure sensor 18 based on the atmospheric pressure value Bp on the pedestrian bridge obtained from the roadside unit 110 and the atmospheric pressure value Cp of the road. Then, the smartphone 1 can calculate the corrected atmospheric pressure value Xpa around the subject device based on the calculated sensitivity correction value C1s using the mathematical expression 3. Accordingly, the smartphone 1 can obtain the atmospheric pressure value Xp around the subject device more accurately using the atmospheric pressure sensor 18. As described above, the smartphone 1 can reduce the error of the detection result in the atmospheric pressure sensor 18.

Even if the user does not perform a maintenance including an update of the application, for example, the smartphone 1 calculate the sensitivity correction value C1s of the atmospheric pressure sensor 18 based on the atmospheric pressure value Bp on the pedestrian bridge obtained from the roadside unit 110 and the atmospheric pressure value Cp of the road every time the user having the subject device crosses the pedestrian bridge. As described above, the smartphone 1 can calculate the sensitivity correction value C1s of the atmospheric pressure sensor 18 regardless of the operation of the user.

Third Embodiment

Figure 11:
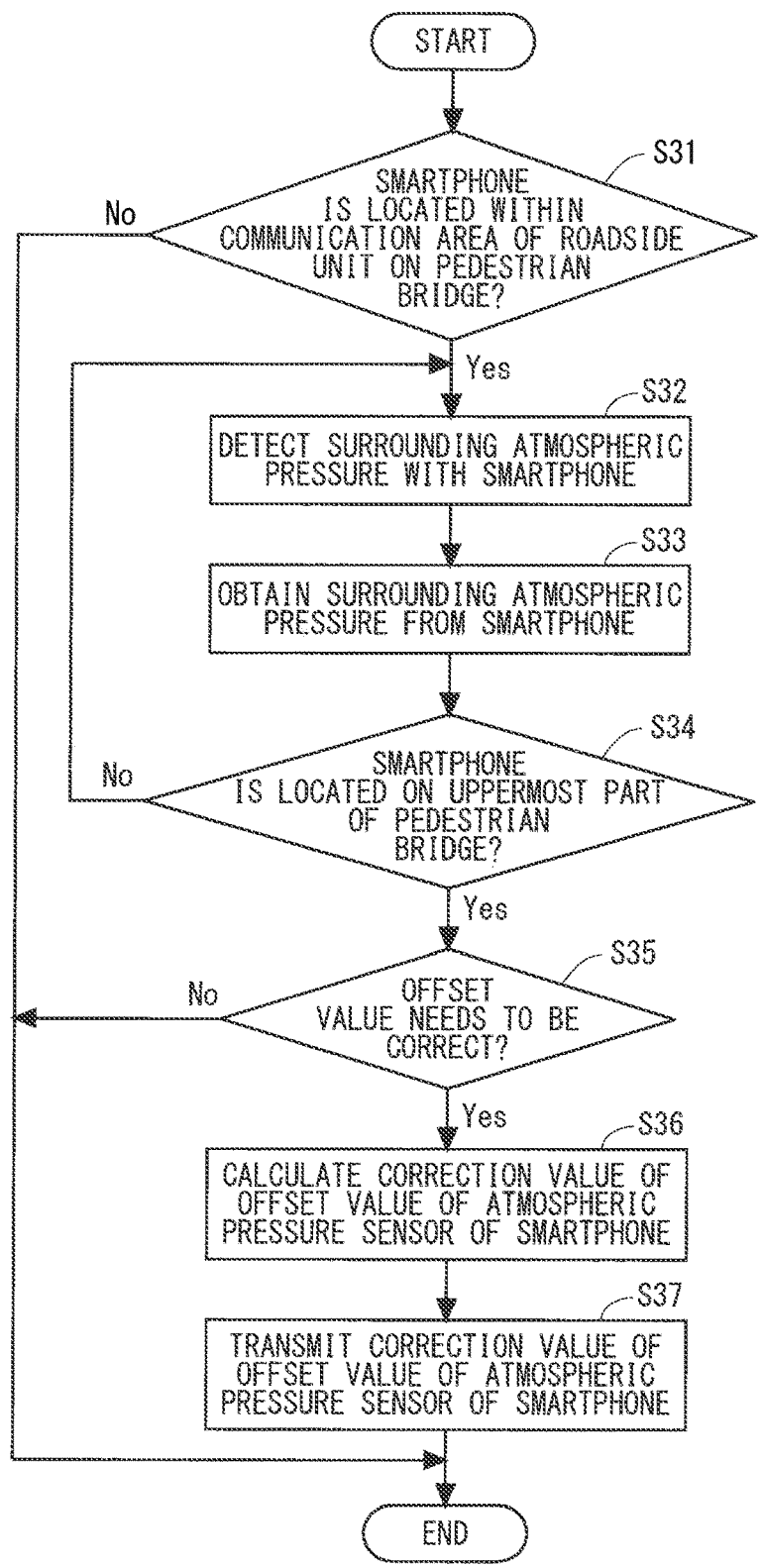
FIG. 11 A flow chart illustrating one example of control performed by a roadside unit according to a third embodiment.

Described using FIG. 11 is the control system 100 including the roadside unit 110 according to one embodiment. One embodiment is different from the first embodiment in that the correction value of the offset value C1o of the atmospheric pressure sensor 18 of the smartphone (the mobile electronic device) 1 is calculated.

The communication unit 111 of the roadside unit 110 communicates with the smartphone 1, and receives the atmospheric pressure data 9B including the identification information of the smartphone 1 and the atmospheric pressure value Xp around the smartphone 1.

If a position of the smartphone 1 with respect to the pedestrian bridge satisfies a predetermined condition, the control program 112A makes the roadside unit 110 calculate the correction value of the offset value C1o of the atmospheric pressure sensor 18 of the smartphone 1 based on the atmospheric pressure value Xp around the smartphone 1 obtained from the smartphone 1. The control program 112A makes the roadside unit 110 transmit the correction value of the offset value C1o of the atmospheric pressure sensor 18 to the smartphone 1.

The smartphone 1 communicates with the roadside unit 110 via the communication unit 6, thereby transmitting the atmospheric pressure value Xp around the subject device to the roadside unit 110.

The control program 9A makes the smartphone 1 transmit the atmospheric pressure value Xp around the subject device to the roadside unit 110 via the communication unit 6.

Next, a method of controlling the roadside unit 110, the control program 112A, and an action thereof are described.

The roadside unit 110 executes the control program 112A stored in the storage 112 using the controller 120, thereby being able to achieve the function illustrated in FIG. 11. The controller 120 may execute a processing procedure of the other function in parallel with a processing procedure illustrated in FIG. 11. A series of processing illustrated in FIG. 11 is executed repeatedly at regular or irregular intervals, for example.

The controller 120 determines whether or not the smartphone 1 is located within the communication area of the roadside unit 110 on the pedestrian bridge (Step S31). In more detail, if the smartphone 1 gets close to within the predetermined distance from the roadside unit 110, the smartphone 1 receives information which the roadside unit 110 wirelessly outputs. Upon receiving the information from the roadside unit 110, the smartphone 1 transmits a response signal to the roadside unit 110. In the roadside unit 110, if the communication unit 111 receives the response signal, the controller 120 determines that the smartphone 1 has received the information which the roadside unit 110 wirelessly outputs. If it is determined that the smartphone 1 has received the information which the roadside unit 110 wirelessly outputs, the controller 120 determines that the smartphone 1 is located in the communication area of the roadside unit 110 on the pedestrian bridge (Yes in Step S31). In the meanwhile, if the communication unit 111 does not receive the response signal, in other words, if the smartphone 1 has not received the information which the roadside unit 110 wirelessly outputs, the controller 120 determines that the smartphone 1 is not located in the communication area of the roadside unit 110 on the pedestrian bridge (No in Step S31).

If it is determined to be Yes in Step S31, the controller 120 makes the smartphone 1 detect the atmospheric pressure around the smartphone 1 (Step S32). In more detail, the controller 120 makes the smartphone 1 turn on the atmospheric pressure sensor 18. Then, the controller 120 makes the smartphone 1 detect the atmospheric pressure around the smartphone 1 with the atmospheric pressure sensor 18. Then, the controller 120 makes the smartphone 1 store the atmospheric pressure value Xp around the smartphone 1 as the atmospheric pressure data 9B in the storage 9. The smartphone 1 repeatedly obtains the atmospheric pressure value Xp.

After Step S32, the controller 120 obtains the atmospheric pressure value Xp repeatedly obtained by the smartphone 1 from the smartphone 1 (Step S33).

After Step S33, the controller 120 determines whether or not the smartphone 1 is located on the uppermost part of the pedestrian bridge (Step S34). In more detail, the controller 120 determines whether or not the smartphone 1 is located on the uppermost part of the pedestrian bridge based on the atmospheric pressure value Xp around the smartphone 1 obtained in Step S33. The controller 120 determines whether or not the user walks on the flat portion of the pedestrian bridge based on the change of the atmospheric pressure value Xp around the smartphone 1.

If the change of the atmospheric pressure value Xp around the smartphone 1 transitions from the decreasing state to the substantially constant state, the controller 120 determines that the smartphone 1 is located on the uppermost part of the pedestrian bridge (Yes in Step S34). If a predetermined period of time has passed since the change of the atmospheric pressure value Xp around the smartphone 1 transitioned from the decreasing state to the substantially constant state and was substantially maintained constant, the controller 120 may determine that the smartphone 1 is located on the uppermost part of the pedestrian bridge. If the change of the atmospheric pressure value Xp around the smartphone 1 is in the increasing state or the decreasing state, the controller 120 determines that the smartphone 1 is not located on the uppermost part of the pedestrian bridge (No in Step S34).

If it is determined to be Yes in Step S34, the controller 120 determines whether or not the offset value C1o of the atmospheric pressure sensor 18 of the smartphone 1 needs to be corrected (Step S35). In more detail, the controller 120 determines whether or not the offset value C1o of the atmospheric pressure sensor 18 needs to be corrected based on the atmospheric pressure value Xp around the smartphone 1 on the uppermost part of the pedestrian bridge obtained from the smartphone 1 and the atmospheric pressure value Bp on the pedestrian bridge. For example, if the difference $\Delta XBp$ between the atmospheric pressure value Xp around the smartphone 1 on the uppermost part of the pedestrian bridge and the atmospheric pressure value Bp on the pedestrian bridge is equal to or larger than the predetermined value, the controller 120 determines that the offset value C1o of the atmospheric pressure sensor 18 needs to be corrected (Yes in Step S35). Alternatively, for example, if the difference $\Delta XBp$ is equal to or larger than the first predetermined value and smaller than the second predetermined value, which is larger than the first predetermined value, the controller 120 may determine that the offset value C1o of the atmospheric pressure sensor 18 needs to be corrected (Yes in Step S35). For example, if the difference $\Delta XBp$ is smaller than the predetermined value (or the first predetermined value), the controller 120 determines that the offset value C1o of the atmospheric pressure sensor 18 needs not be corrected (No in Step 35).

If it is determined to be Yes in Step S35, the controller 120 calculates the correction value of the offset value C1o of the atmospheric pressure sensor 18 of the smartphone 1 (Step S36). In more detail, the controller 120 calculates the correction value of the offset value C1o of the atmospheric pressure sensor 18 based on the atmospheric pressure value Bp on the pedestrian bridge. The controller 120 determines the weighting coefficient based on the difference $\Delta XBp$. The controller 120 adds the value obtained by multiplying the difference $\Delta XBp$ by the determined weighting coefficient to the offset value C1o, thereby calculating the correction value of the offset value C1o.

After Step S36, the controller 120 transmits the correction value of the offset value C1o of the atmospheric pressure sensor 18 of the smartphone 1 to the smartphone 1 (Step S37). Then, in the smartphone 1, the correction is performed on the atmospheric pressure sensor 18 based on the correction value of the offset value C1o of the atmospheric pressure sensor 18.

In this manner, the controller 120 of the roadside unit 110 calculates the correction value of the offset value C1o of the atmospheric pressure sensor 18 of the smartphone 1 based on the atmospheric pressure value Bp on the pedestrian bridge, and the smartphone 1 performs the correction on the atmospheric pressure sensor 18 based on the calculated correction value.

According to the embodiment described above, the roadside unit 110 can correct the offset value C1o of the atmospheric pressure sensor 18 of the smartphone 1 based on the atmospheric pressure value Bp on the pedestrian bridge. Accordingly, the smartphone 1 can perform the correction on the atmospheric pressure sensor 18, and as a result, the smartphone 1 can obtain the atmospheric pressure value Xp around the subject device more accurately using the atmospheric pressure sensor 18. As described above, the smartphone 1 can reduce the error of the detection result in the atmospheric pressure sensor 18. The roadside unit 110 may directly add the difference $\Delta XBp$ to the offset value C1o without using the weighting coefficient to calculate the correction value of the offset value C1o.

Fourth Embodiment

Figure 12:
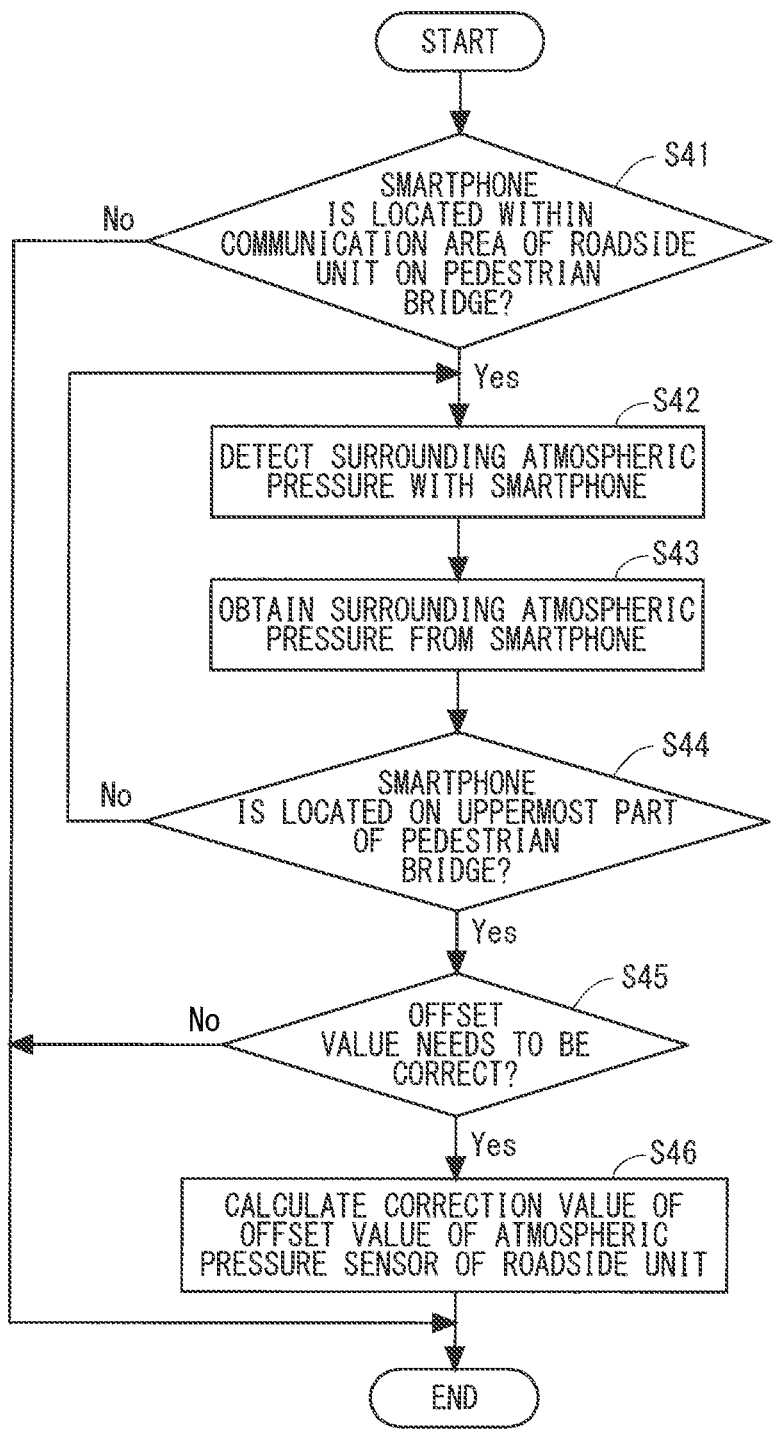
FIG. 12 A flow chart illustrating one example of control performed by a roadside unit according to a fourth embodiment.

Described using FIG. 12 is the control system 100 including the roadside unit 110 according to one embodiment. One embodiment is different from the third embodiment in that the correction value of the offset value C1o of the atmospheric pressure sensor 113 is calculated in the roadside unit 110.

In one embodiment, the detection accuracy of the atmospheric pressure sensor 113 of the roadside unit 110 is lower than that of the atmospheric pressure sensor 18 of the smartphone 1. Then, the atmospheric pressure sensor 113 generates the offset in the detected atmospheric pressure value Ap around the roadside unit 110. The offset generated in the atmospheric pressure sensor 113 is caused by a temperature and weather, for example. The offset value C2o indicates this offset.

If a position of the smartphone 1 with respect to the pedestrian bridge satisfies a predetermined condition, the control program 112A makes the roadside unit 110 calculate the correction value of the offset value C2o of the atmospheric pressure sensor 113 based on the atmospheric pressure value Xp around the smartphone 1 on the uppermost part of the pedestrian bridge obtained from the smartphone 1.

The smartphone 1 communicates with the roadside unit 110 via the communication unit 6, thereby transmitting the atmospheric pressure data 9B including the atmospheric pressure value Xp around the subject device to the roadside unit 110.

The control program 9A makes the smartphone 1 transmit the atmospheric pressure data 9B including the atmospheric pressure value Xp around the subject device to the roadside unit 110 via the communication unit 6.

Next, a method of controlling the roadside unit 110, the control program 112A, and an action thereof are described. Processing of Step S41 to Step S44 is similar to that of Step S31 to Step S34 of the flow chart illustrated in FIG. 11. A series of processing illustrated in FIG. 12 is executed repeatedly at regular or irregular intervals, for example. Processing of Step S41 to Step S44 is similar to that of Step S31 to Step S34 of the flow chart illustrated in FIG. 11.

If it is determined to be Yes in Step S44, the controller 120 determines whether or not the offset value C2o of the atmospheric pressure sensor 113 needs to be corrected (Step S45). In more detail, the controller 120 determines whether or not the offset value C2o of the atmospheric pressure sensor 113 needs to be corrected based on the atmospheric pressure value Xp around the smartphone 1 on the uppermost part of the pedestrian bridge obtained from the smartphone 1 and the atmospheric pressure value Bp on the pedestrian bridge. For example, if the difference ΔXBp between the atmospheric pressure value Xp around the smartphone 1 on the uppermost part of the pedestrian bridge and the atmospheric pressure value Bp on the pedestrian bridge is equal to or larger than the predetermined value, the controller 120 determines that the offset value C2o of the atmospheric pressure sensor 113 needs to be corrected (Yes in Step S45).

Alternatively, for example, if the difference ΔXBp is equal to or larger than the first predetermined value and smaller than the second predetermined value, which is larger than the first predetermined value, the controller 120 may determine that the offset value C2o of the atmospheric pressure sensor 113 needs to be corrected (Yes in Step S45). For example, if the difference ΔXBp is smaller than the predetermined value (or the first predetermined value), the controller 120 determines that the offset value C2o of the atmospheric pressure sensor 113 needs not be corrected (No in Step 45).

If it is determined to be Yes in Step S45, the controller 120 calculates the correction value of the offset value C2o of the atmospheric pressure sensor 113 (Step S46). In more detail, the controller 120 calculates the correction value of the offset value C2o of the atmospheric pressure sensor 113 based on the atmospheric pressure value Xp around the smartphone 1 on the uppermost part of the pedestrian bridge. The controller 120 determines the weighting coefficient based on the difference ΔXBp. The controller 120 adds the value obtained by multiplying the difference ΔXBp by the determined weighting coefficient to the offset value C2o, thereby calculating the correction value of the offset value C2o. In one embodiment, if the determined weighting coefficient is 1/10000, the controller 120 can calculate the correction value of the offset value C2o from the following mathematical expression 5.

$$C2o+(1/10000) \cdot \Delta XBp \quad (5)$$

In this manner, the controller 120 calculates the correction value of the offset value C2o of the atmospheric pressure sensor 113 based on the atmospheric pressure value Xp around the smartphone 1 on the uppermost part of the pedestrian bridge, and performs the correction on the atmospheric pressure sensor 113 based on the calculated correction value.

According to one embodiment, the roadside unit 110 can calculate the correction value of the offset value C2o of the atmospheric pressure sensor 113 based on the atmospheric pressure value Xp around the smartphone 1 on the uppermost part of the pedestrian bridge. As described above, the correction is performed on the atmospheric pressure sensor 113, thus the roadside unit 110 can obtain the atmospheric pressure value Bp on the pedestrian bridge using the atmospheric pressure sensor 113 more accurately. As described above, the roadside unit 110 can reduce the error of the detection result in the atmospheric pressure sensor 113.

Even if a maintenance including an inspection of the atmospheric pressure sensor 113 is not performed, for example, the roadside unit 110 can correct the offset value C2o of the atmospheric pressure sensor 113 every time the user having the smartphone 1 crosses the pedestrian bridge. The roadside unit 110 may directly add the difference ΔXBp to the offset value C2o without using the weighting coefficient to calculate the correction value of the offset value C2o.

Fifth Embodiment

Figure 13:
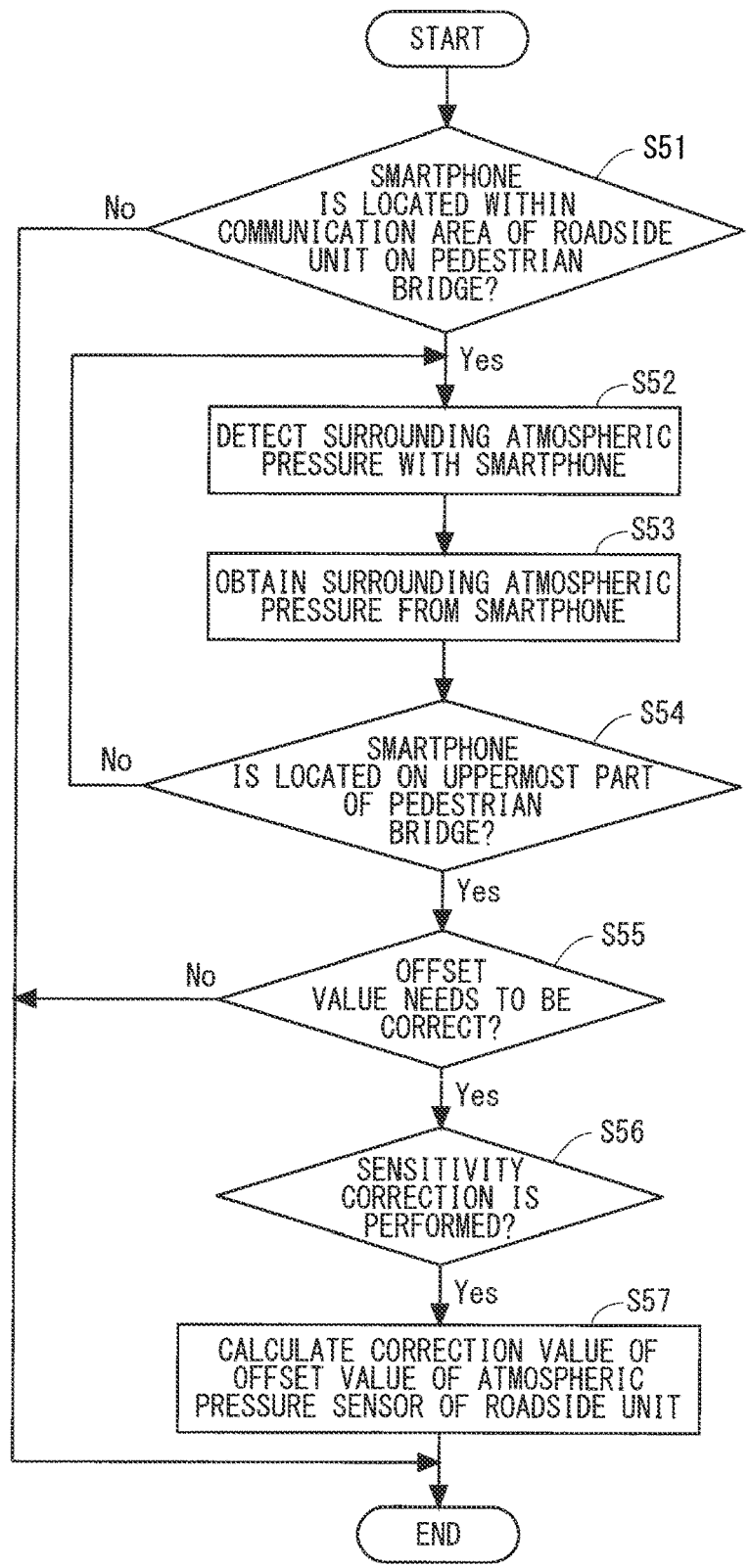
FIG. 13 A flow chart illustrating one example of control performed by a roadside unit according to a fifth embodiment.

Described using FIG. 13 is the control system 100 including the roadside unit 110 according to one embodiment. One embodiment is different from the fourth embodiment in that the correction value of the offset value C2o of the atmospheric pressure sensor 113 is calculated if the sensitivity of the atmospheric pressure sensor 18 of the smartphone 1 is corrected.

If a position of the smartphone 1 with respect to the pedestrian bridge satisfies a predetermined condition, and if the sensitivity of the atmospheric pressure sensor 18 of the smartphone 1 is corrected, the control program 112A makes the roadside unit 110 calculate the correction value of the offset value C2o of the atmospheric pressure sensor 113 based on the atmospheric pressure value Xp around the smartphone 1 on the uppermost part of the pedestrian bridge obtained from the smartphone 1.

The smartphone 1 communicates with the roadside unit 110 via the communication unit 6, thereby transmitting the setting data 9Z together with the atmospheric pressure data 9B including the atmospheric pressure value Xp around the subject device to the roadside unit 110.

The setting data 9Z includes information indicating that "the sensitivity correction is completed" in a case where the sensitivity of the atmospheric pressure sensor 18 is corrected. The setting data 9Z includes information indicating that "the sensitivity correction is completed" also in a case where the sensitivity of the atmospheric pressure sensor 18 needs not be corrected.

The control program 9A makes the smartphone 1 transmit the setting data 9Z together with the atmospheric pressure data 9B including the atmospheric pressure value Xp around the subject device to the roadside unit 110 via the communication unit 6.

Next, a method of controlling the roadside unit 110, the control program 112A, and an action thereof are described using FIG. 13. Step S51 to Step S55 and Step S57 are similar to Step S41 to Step S45 and Step S46 of the flow chart illustrated in FIG. 12. A series of processing illustrated in FIG. 13 is executed at regular or irregular intervals, for example.

If it is determined to be Yes in Step S55, the controller 120 determines whether or not the sensitivity is corrected (Step S56). In more detail, the controller 120 determines whether or not the sensitivity of the atmospheric pressure sensor 18 of the smartphone 1 is corrected based on the setting data 9Z obtained from the smartphone 1. If the controller 120 determines that the sensitivity is corrected (Yes in Step S56), the controller 120 takes the processing to Step S57. If the controller 120 determines that the sensitivity is not corrected (No in Step S56), the controller 120 finishes the processing.

In this manner, if the sensitivity of the atmospheric pressure sensor 18 of the smartphone 1 is corrected, the controller 120 calculates the correction value of the offset value C2o of the atmospheric pressure sensor 113 based on the atmospheric pressure value Xp around the smartphone 1 on the uppermost part of the pedestrian bridge.

According to one embodiment, if the sensitivity of the atmospheric pressure sensor 18 of the smartphone 1 is corrected, the roadside unit 110 can calculate the correction value of the offset value C2o of the atmospheric pressure sensor 113 based on the atmospheric pressure value Xp around the smartphone 1 on the uppermost part of the pedestrian bridge. Accordingly, if the sensitivity of the atmospheric pressure sensor 18 of the smartphone 1 is correct, the roadside unit 110 can calculate the correction value of the offset value C2o of the atmospheric pressure sensor 113 of the roadside unit 110.

Accordingly, the roadside unit 110 can obtain the atmospheric pressure value Bp on the pedestrian bridge using the atmospheric pressure sensor 113 more accurately. In other words, the roadside unit 110 can reduce the error of the detection result in the atmospheric pressure sensor 113.

The embodiments disclosed by the present application can be modified within the gist and scope of the present disclosure. Furthermore, the embodiments disclosed by the present application and the modification thereof can be appropriately combined. For example, the above embodiments may be modified as described below.

The smartphone is described as one example of the mobile electronic device, however, the device according to the appended claims is not limited to the smartphone.

The device according to the appended claims may be a mobile electronic device other than the smartphone. The mobile electronic device includes, for example, a mobile phone, a tablet, a portable personal computer, a digital camera, a media player, an electronic book reader, a navigator, and a game machine, but is not limited thereto.

The pedestrian is described as one example of the user of the smartphone 1, however, a user on a bicycle may also be applicable.

In the above embodiment, the atmospheric pressure value Xp around the smartphone 1 is described without consideration for the altitude of the smartphone 1 measured from feet of the user. The atmospheric pressure value Xp around the smartphone 1 on the uppermost part of the pedestrian bridge may be calculated more accurately in consideration of the altitude of the smartphone 1 measured from the feet of the user. For example, if the display 2A of the smartphone 1 displays a screen, an altitude of a chest of the user may be applied to the altitude of the smartphone 1. For example, if it is determined that the smartphone 1 is in a state of moving by means of a bicycle, an altitude of a basket of the bicycle may also be applied to the altitude of the smartphone 1.

If the altitude of the roadside unit 110 with respect to the pedestrian bridge is uniformly defined as a predetermined value, the above sea level Ah of the roadside unit 110 is unnecessary. Thus, time and effort to register the above sea level Ah of the roadside unit 110 can be reduced. A possibility of an incorrect setting in registration can be reduced.

Furthermore, if the altitude of the pedestrian bridge with respect to the road is uniformly defined as a predetermined value, altitude information needs not be registered previously. A possibility of an incorrect setting in registration can be reduced.

It is also applicable that the change of the atmospheric pressure value Xp around the smartphone 1 in a case where the user crosses the pedestrian bridge is previously listed and stored, and the processing subsequent to Step S44 of the flow chart illustrated in FIG. 12 is performed on the user who finishes crossing the pedestrian bridge as usual. Accordingly, the correction value of the offset value C2o of the atmospheric pressure sensor 113 can be calculated based on the atmospheric pressure value Xp around the smartphone 1 of the user who finishes crossing the pedestrian bridge as usual excepting the user who stops walking on the pedestrian bridge and the user who walks back halfway through the pedestrian bridge. Thus, the correction value of the offset value C2o of the atmospheric pressure sensor 113 can be calculated more accurately.

The error of the atmospheric pressure value measured by the atmospheric pressure sensor 113 and the atmospheric pressure sensor 18 includes, in some cases, a linearity error with a non-linear shape which cannot be corrected by the offset value or the sensitivity correction. Thus, the linearity error can be corrected by listing and storing the correction value corresponding to each measurement value such as 1000 [hPa], and 900 [hPa], for example, for each of the atmospheric pressure sensor 113 and the atmospheric pressure sensor 18.

The linearity error can be corrected using the following mathematical expression 6, for example.

$$Xpa = Xp + f(Xp) \qquad (6)$$

In the mathematical expression 6, Xpa expresses a corrected atmospheric pressure value, Xp expresses an uncorrected atmospheric pressure value, and f(Xp) expresses a function approximating a distribution of the correction value corresponding to each measurement value which has been listed and stored. The approximate function f(Xp) may be calculated by performing a polynomial approximation, for example, on the distribution of the correction value corresponding to the measurement value.

The atmospheric pressure value measured by the atmospheric pressure sensor 113 and the atmospheric pressure sensor 18 includes the error due to temperature characteristics in some cases. If the correction value corresponding to each temperature is previously listed and stored, the temperature characteristics can also be corrected. Thus, the correction value of the offset value C2o of the atmospheric pressure sensor 113 can be calculated more accurately.

The error of the atmospheric pressure value due to the temperature characteristics can be corrected using the following mathematical expression 7, for example.

$$Xpa = Xp + f(Xp, Xt) \qquad (7)$$

In the mathematical expression 7, Xpa expresses a corrected atmospheric pressure value, Xp expresses an uncorrected atmospheric pressure value, Xt expresses a temperature, and f(Xp, Xt) expresses a function approximating a distribution of the correction value corresponding to each temperature. The approximate function f(Xp, Xt) may be calculated by performing a polynomial approximation, for example, on the distribution of the correction value corresponding to the measurement value.

The art of appended claims has been described with respect to specific embodiments for a clear disclosure. However, the appended claims are not to be thus limited but are to be construed as embodying all modifications and alternative constructions that may occur to one skilled in the art which fairly fall within the basic teaching herein set forth.

The invention claimed is:

1. A mobile electronic device, comprising:
 a communicator configured to obtain a first atmospheric pressure value on a pedestrian bridge from a roadside unit associated with the pedestrian bridge;
 an atmospheric pressure sensor configured to obtain a second atmospheric pressure value of the mobile electronic device; and at least one processor configured to
  determine whether or not the mobile electronic device is located on an uppermost part of the pedestrian bridge, and
  when it is determined that the mobile electronic device is located on the uppermost part of the pedestrian bridge, calculate a correction value of the second atmospheric pressure value based on the first atmospheric pressure value.

2. The mobile electronic device according to claim 1, wherein
the at least one processor is further configured to
  determine a weighting coefficient based on the first atmospheric pressure value and the second atmospheric pressure value, and
  multiply the correction value by the weighting coefficient to perform a correction on the atmospheric pressure sensor.

3. A roadside unit, comprising:
a first communicator configured to obtain a first atmospheric pressure value from a mobile electronic device;
a second communicator configured to transmit data to the mobile electronic device;
an atmospheric pressure sensor configured to obtain a second atmospheric pressure value on a pedestrian bridge associated with the roadside unit; and
at least one processor configured to
  determine whether or not the mobile electronic device is located on an uppermost part of the pedestrian bridge, and
  when it is determined that the mobile electronic device is located on the uppermost art of the pedestrian bridge
    calculate a correction value of the first atmospheric pressure value based on the second atmospheric pressure value, and
    control the second communicator so that the second communicator transmits the data including the calculated correction value.

4. The roadside unit according to claim 3, wherein
the at least one processor is further configured to
  determine a weighting coefficient based on the first atmospheric pressure value and the second atmospheric pressure value, and
  control the second communicator so that the second communicator transmits the data including the correction value multiplied by the determined weighting coefficient.

5. A roadside unit, comprising:
a communicator configured to obtain a first atmospheric pressure value from a mobile electronic device;
an atmospheric pressure sensor configured to obtain a second atmospheric pressure value on a pedestrian bridge associated with the roadside unit; and
at least one processor configured to
  determine whether or not the mobile electronic device is located on an uppermost part of the pedestrian bridge, and
  when it is determined that the mobile electronic device is located on the uppermost part of the pedestrian bridge, calculate a correction value of the second atmospheric pressure value based on the first atmospheric pressure value.

6. The roadside unit according to claim 5, wherein
the at least one processor is further configured to
  determine a weighting coefficient based on the first atmospheric pressure value and the second atmospheric pressure value, and
  multiply the correction value by the weighting coefficient to perform a correction on the atmospheric pressure sensor.

* * * * *